US012125145B2

(12) United States Patent
Gantzer

(10) Patent No.: US 12,125,145 B2
(45) Date of Patent: Oct. 22, 2024

(54) SYSTEMS AND METHODS FOR IMPLEMENTED MIXED REALITY IN LABORATORY AUTOMATION

(71) Applicant: BEAM THERAPEUTICS INC., Cambridge, MA (US)

(72) Inventor: Robert K. Gantzer, Cambridge, MA (US)

(73) Assignee: Beam Therapeutics Inc., Cambridge, MA (US)

( * ) Notice: Subject to any disclaimer, the term of this patent is extended or adjusted under 35 U.S.C. 154(b) by 181 days.

(21) Appl. No.: 17/426,602

(22) PCT Filed: Feb. 3, 2020

(86) PCT No.: PCT/US2020/016360
§ 371 (c)(1),
(2) Date: Jul. 28, 2021

(87) PCT Pub. No.: WO2020/163218
PCT Pub. Date: Aug. 13, 2020

(65) Prior Publication Data
US 2022/0139046 A1    May 5, 2022

Related U.S. Application Data

(60) Provisional application No. 62/801,045, filed on Feb. 4, 2019.

(51) Int. Cl.
*G06T 19/00* (2011.01)
*G06T 13/20* (2011.01)
(Continued)

(52) U.S. Cl.
CPC ............ *G06T 19/006* (2013.01); *G06T 13/20* (2013.01); *G06V 20/20* (2022.01); *G09B 5/02* (2013.01);
(Continued)

(58) Field of Classification Search
None
See application file for complete search history.

(56) References Cited

U.S. PATENT DOCUMENTS 8,542,906 B1 * 9/2013 Persson ................. G06V 20/20
382/103
8,914,472 B1 * 12/2014 Lee ........................ G06Q 30/04
709/219
(Continued)

FOREIGN PATENT DOCUMENTS

FR    2949587 A1    3/2011

OTHER PUBLICATIONS

Didier et al., "AMRA: Augmented Reality Assistance for Train Maintenance Tasks," Workshop Industrial Augmented Reality, 4th ACM/IEEE International Symposium on Mixed and Augmented Reality (ISMAR 2005), Oct. 2005, vol. hal-00339457, pp. 1-11.
(Continued)

*Primary Examiner* — David H Chu
(74) *Attorney, Agent, or Firm* — Melissa Hunter-Ensor; Kristopher Reichlen; Greenberg Traurig, LLP

(57) ABSTRACT

Systems and methods for providing instructing mixed reality overlays for configuring automation protocols in laboratory processes using computing systems include receiving an image from an image feed of an environment. Component markers in the image of the environment are detected and matched with an associated environment component, an environment component action or both. The environment component or environment component action, or both are selected and an animation of an instruction is rendered. An overlay of the animation is caused to display in an augmented reality device associated with a user to appear in a location in the environment of the environment component or environment component action, or both.

20 Claims, 19 Drawing Sheets

(51) Int. Cl.
*G06V 20/20* (2022.01)
*G09B 5/02* (2006.01)
*G09B 19/24* (2006.01)
*G06K 7/14* (2006.01)

(52) U.S. Cl.
CPC ........... *G09B 19/24* (2013.01); *G06K 7/1413* (2013.01); *G06K 7/1417* (2013.01)

(56) References Cited

U.S. PATENT DOCUMENTS

| | | | | |
|---|---|---|---|---|
| 10,430,655 | B2* | 10/2019 | Komatsu | G06F 3/04842 |
| 11,520,314 | B2* | 12/2022 | Schwarz | G05B 19/4183 |
| 11,537,103 | B2* | 12/2022 | Onose | G05B 19/4183 |
| 2011/0115816 | A1* | 5/2011 | Brackney | H05B 47/10 700/295 |
| 2012/0320088 | A1* | 12/2012 | Ihara | G06F 3/0481 345/629 |
| 2013/0114100 | A1* | 5/2013 | Torii | H04N 1/00037 358/1.14 |
| 2014/0118339 | A1 | 5/2014 | Davies et al. | |
| 2014/0176603 | A1 | 6/2014 | Kumar et al. | |
| 2015/0221134 | A1* | 8/2015 | Koga | G06T 19/006 345/633 |
| 2015/0302650 | A1* | 10/2015 | Abdelmoati | G06F 3/041 345/633 |
| 2015/0325047 | A1* | 11/2015 | Conner | G06F 3/04847 345/633 |
| 2016/0176724 | A1* | 6/2016 | Ji | B63J 4/00 700/282 |
| 2016/0253563 | A1* | 9/2016 | Lam | H04L 63/08 348/130 |
| 2016/0292925 | A1* | 10/2016 | Montgomerie | H04L 65/75 |
| 2016/0300109 | A1* | 10/2016 | Aonuma | G06F 3/147 |
| 2016/0307459 | A1* | 10/2016 | Chestnut | G06F 3/16 |
| 2016/0314623 | A1* | 10/2016 | Coleman | G05B 19/409 |
| 2017/0213316 | A1 | 7/2017 | Bean et al. | |
| 2017/0307246 | A1* | 10/2017 | Ohara | F24F 11/58 |
| 2018/0082480 | A1* | 3/2018 | White | G06T 11/00 |
| 2018/0131907 | A1* | 5/2018 | Schmirler | H04N 23/698 |
| 2018/0197043 | A1 | 7/2018 | Wang et al. | |
| 2018/0211447 | A1* | 7/2018 | Spayd | G06Q 10/20 |
| 2018/0220011 | A1* | 8/2018 | Nakatsu | G06K 7/10722 |
| 2019/0043264 | A1* | 2/2019 | Tomizuka | G06F 3/017 |
| 2019/0097896 | A1* | 3/2019 | Kritzler | G06F 3/014 |
| 2019/0362556 | A1* | 11/2019 | Ben-Dor | G06T 19/006 |
| 2020/0026257 | A1* | 1/2020 | Dalal | G05B 19/4063 |
| 2020/0250890 | A1* | 8/2020 | Zhou | G06T 7/55 |

OTHER PUBLICATIONS

Henderson et al., "Augmented Reality for Maintenance and Repair (ARMAR)," Columbia University Computer Graphics & User Interfaces Lab, Dec. 21, 2012, pp. 1-5.

Oliveira et al., "An Augmented Reality Application to Support Maintenance—Is It Possible?," MPMM 2013 (Maintenance Performance Measurement and Management), 2013, pp. 1-12.

Rukubayihunga et al., "Towards Assembly Steps Recognition in Augmented Reality," VRIC 2016, Mar. 23-25, 2016, pp. 1-5.

International Search Report and Written Opinion mailed Apr. 23, 2020 in corresponding International PCT Patent Application No. PCT/US2020/016360 (17 pages).

Extended European Search Report dated Oct. 5, 2022 in corresponding European Patent Application No. 20751960.4 (8 pages).

International Search Report and Written Opinion in International Patent Application No. PCT/US2020/016360, mailed Apr. 23, 2020 (17 pages).

* cited by examiner

Automation Script 500

*FIG. 5A*

| | | Bobs_TestMethod.med (Modified) |
|---|---|---|
| Method | HEPA | OnAbort |

| | | Method |
|---|---|---|
| 1 | ⏻ | Initialize (Single Step) on ML_STAR<br>Always initialize: Off<br>3 return value(s). |
| 2 | 1 f(x) | TurnDeckLightOn of HSLVantageLib<br>HSLVantageLib::TurnDeckLightOn(ML_STAR, 100) |
| 3 | ⊞◐ | Grouping |
| 10 | ▦ | Sequence: Set End Position<br>end position of sequence "ML_STAR.PCR_Tube_3plateAlt_Dispense" ="104" |
| 11 | ▷▽▽ | 1000μl Channel Pipette - Aliquot from Microlab®STAR Smart Steps<br>Instrument short name "ML_STAR", Aliquot procedure, Volume per well [μl]: "10.<br>Aspirate sequence: "ML_STAR.Tube_1mL_Asp", Dispense sequence:<br>"ML_STAR.PCR_Tube_3plateAlt_Dispense (controlling sequence)". |
| 12 | 1000 | 1000ul Channel Tip Pick Up (Single Step) on ML_STAR<br>Channel (1..8): 11111111, Optimized channel use: All sequence positions, Sequence: ML_STAR.Tips_300ul.<br>Sequence counting: (0) Manually<br>3 return value(s). |
| 13 | 1000 | 1000ul Channel Aspirate on ML_STAR<br>Sequence: ML_STAR.Trough, Volume [ul]: 124, Liquid class:<br>"StandardVolumeFilter_DMSO_DispenseSurface_Part"<br>0 return value(s). |
| 14 | ⊟ | Loop<br>"12" times<br>"loopCounter1" used as loop counter variable |
| 15 | 1000 | 1000ul Channel Dispense on ML_STAR<br>Sequence: ML_STAR.Cell_10, Volume [ul]: 10, Liquid class: As in first aspiration of cycle<br>0 return value(s). |
| 16 | | End Loop |
| 17 | 1000 | 1000ul Channel Dispense on ML_STAR<br>Sequence: ML_STAR.Trough, Volume [ul]: Remaining volume inclusive blowout air, Liquid class: As in first<br>aspiration of cycle<br>0 return value(s). |
| 18 | ▷▽▽ | 1000μl Channel Pipette - Aliquot from Microlab®STAR Smart Steps<br>Instrument short name "ML_STAR", Aliquot procedure, Volume per well [μl]: "10.<br>Aspirate sequence: "ML_STAR.Trough", Dispense sequence:"ML_STAR.Cell_10 (controlling sequence)". |
| 19 | 1000 | 1000ul Channel Tip Eject (Single Step) on ML_STAR<br>Channel (1..8): 11111111, Optimized channel use: All sequence positions, Use default waste: Off Sequence:<br>ML_STAR.Tips_300ul, Sequence counting: (0) Manually |

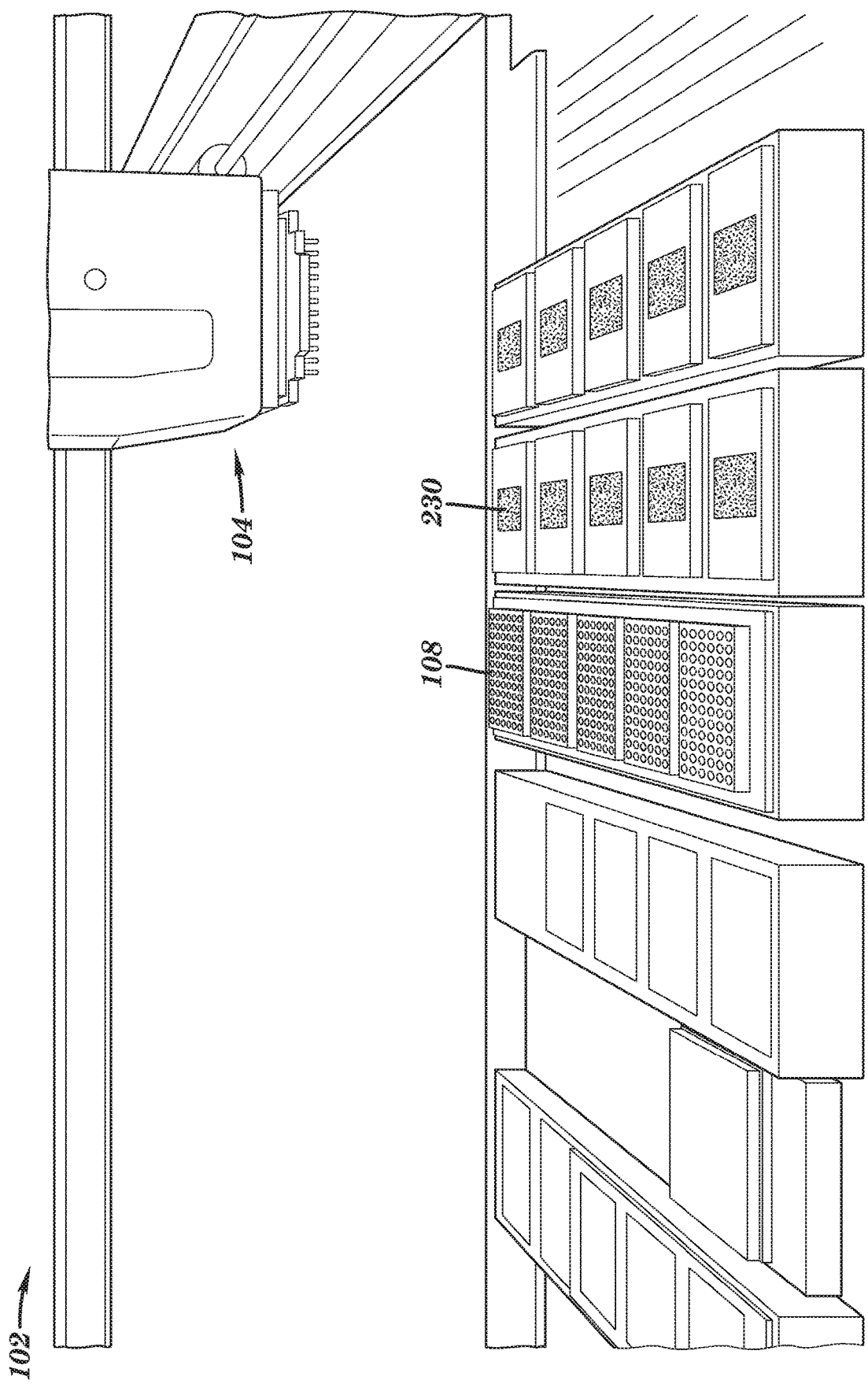

SYSTEMS AND METHODS FOR IMPLEMENTED MIXED REALITY IN LABORATORY AUTOMATION

This application is the U.S. national phase application, pursuant to 35 U.S.C. § 371, of PCT International Application No. PCT/US2020/016360, filed Feb. 3, 2020, which claims priority to U.S. Provisional Application Ser. No. 62/801,045, filed Feb. 4, 2019, the contents of each of which are hereby incorporated by reference in their entirety.

BACKGROUND

Generally, laboratory automation is utilized to research, develop, optimize and capitalize on technologies in the laboratory. Laboratory automation professionals are typically academic, commercial and government researchers, scientists and engineers who conduct research and develop new technologies to increase productivity, elevate experimental data quality, reduce lab process cycle times, or enable experimentation that otherwise would be impossible. A popular application of laboratory automation technology is laboratory robotics utilizing different automated laboratory instruments, devices, software algorithms, and methodologies used to enable, expedite and increase the efficiency and effectiveness of scientific research in laboratories. One example of such robotic system in an automated laboratory setting is the use of autosamplers using micro syringes. Laboratories devoted to activities such as high-throughput screening, combinatorial chemistry, automated clinical and analytical testing, diagnostics, large scale biorepositories, and many others, would not exist without advancements in laboratory automation.

Automated laboratory systems can be expensive and require very precise setup and configuration to ensure that the automated equipment can perform the specific tasks without issue. As such, downtime within an automated laboratory (caused by malfunctions, crashes, errors, etc.) can be costly in time and financials to resolve the issue(s) causing the downtime. A significant number of lab automation crashes or errors, such as sample processing errors, can be attributed to human error. A large percentage of human errors are caused by misplaced or improperly setup labware.

SUMMARY

There is a need for improvements for assisting users in the configuration and management of an automated laboratory, particularly by providing users with more straightforward guidance on where labware should be placed and how the automated laboratory should be setup can help to eliminate mistakes, increase safety, and reduce instrument downtime due to crashes. Additionally, providing users with real time feedback for what is occurring during operation of the automated lab can assist the user to understand what is happening and spot potential issues. The present invention is directed toward further solutions to address this need, in addition to having other desirable characteristics.

BRIEF DESCRIPTION OF THE FIGURES

These and other characteristics of the present invention will be more fully understood by reference to the following detailed description in conjunction with the attached drawings, in which:

FIGS. 7A, 7B, 7C, 7D, 7E, 7F, 7G, 7H, 7I, AND 7J are exemplary implementations of configuring an automated laboratory using augmented reality.

DETAILED DESCRIPTION

Figure 1:
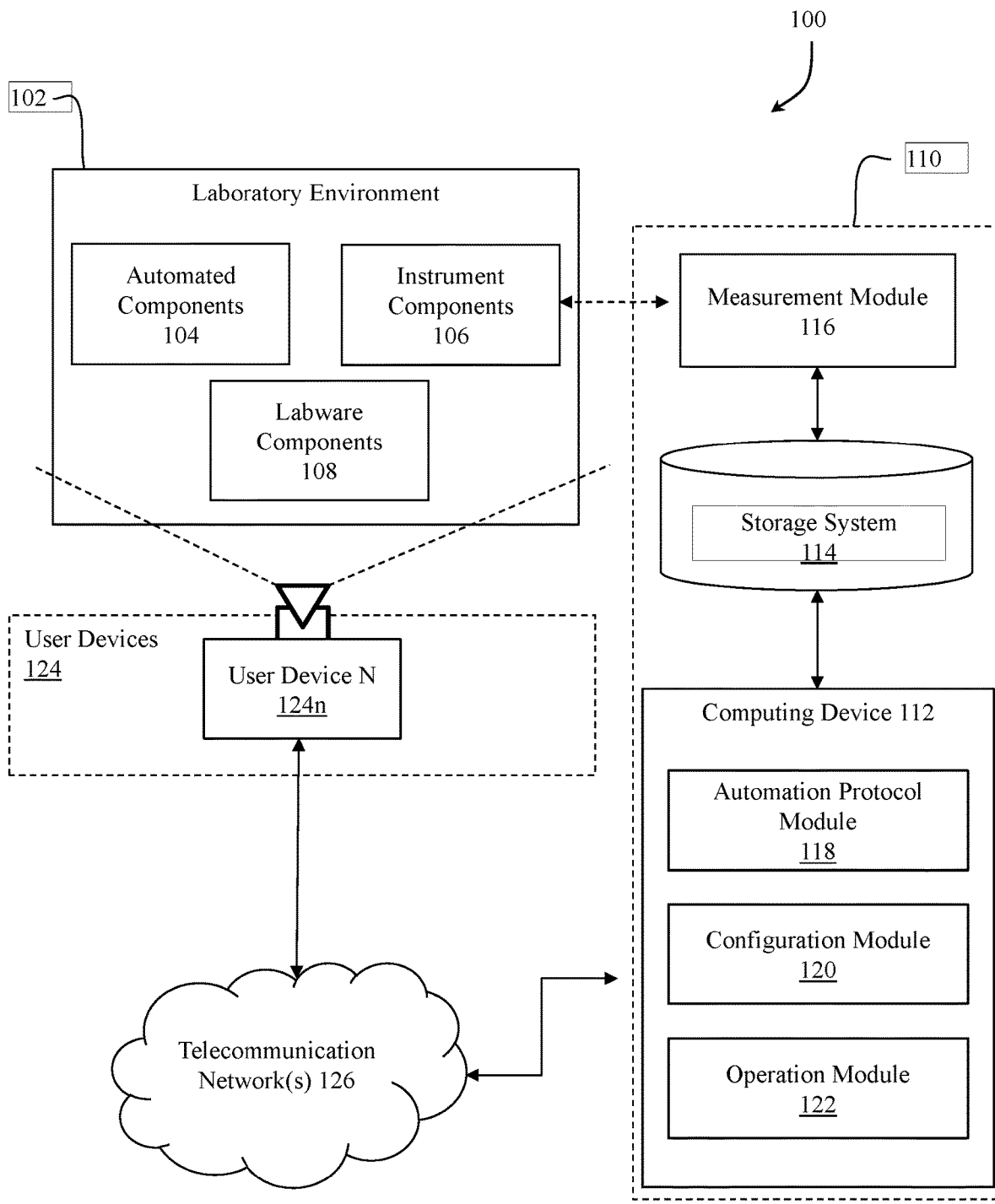
FIG. 1 is an exemplary computing system for implementing the systems and methods of the present invention.

An illustrative embodiment of the present invention relates to systems and methods for providing mixed reality content within an automated laboratory. The incorporation of mixed reality into a real-time view of the laboratory environment is provided to help bridge the gap between digital protocols and actual execution. The present invention can assist in the setup experiments and track what is happening during execution of those experiments in real-time via rendering of mixed reality content.

FIGS. 1 through 8, wherein like parts are designated by like reference numerals throughout, illustrate an example embodiment or embodiments of improved operation for automated laboratories by implementing augmented reality, according to the present invention. Although the present invention will be described with reference to the example embodiment or embodiments illustrated in the figures, it should be understood that many alternative forms can embody the present invention. One of skill in the art will additionally appreciate different ways to alter the parameters of the embodiment(s) disclosed in a manner still in keeping with the spirit and scope of the present invention.

FIG. 1 depicts an illustrative system 100 for implementing the steps in accordance with the aspects of the present invention. In particular, a computing architecture 110 may interface with user devices 124, either directly or via a telecommunication network(s) 126 to provide mixed reality (MR) assistance with configuring, administering, and monitoring automated lab processes in a laboratory environment 102. As used herein, the term "mixed reality" refers to virtual reality, augmented reality, or other interface for providing virtual auditory and visual objects to a user, and any combination thereof. In some embodiments, the computing architecture 110 uses MR objects to provide cues related to the laboratory environment 102 such that a user may interact with a sophisticated and complex laboratory environment 102 with minimal training while also minimizing risks due to user error.

In particular, the system 100 may include a combination of hardware and software implemented within an automated laboratory 102 for carrying out automated laboratory processes. The automated laboratory 102 can include a combination of components that would commonly be located within an automated lab and may be set-up, configured, initialized or otherwise manipulated to automatically perform laboratory processes with respect to a sample or other process subject. In some embodiments, the components can include automated components 104, instrument components 106, and labware components 108. In some embodiments, each of the automated components 104, instrument components 106, and labware components 108 may be recognizable by the computing architecture 110 such that the computing architecture 110 may assist with the set-up, configuration, initialization or other manipulation/interaction based on the detection and recognition of each component in a predefined laboratory protocol.

The automated components 104 can include any combination of automated lab equipment including robotics, conveyers, computing systems, or any automated laboratory components known in the art. For example, the automated components 104 can include robotic arms, actuators, automated samplers, etc. As would be appreciated by one skilled in the art, the automated components 104, and configuration thereof, can vary based on laboratory size, type of research, etc. In some embodiments, the automated components 104 may be recognizable by the computing architecture 110 using, e.g., computer identifiable objects or markers placed thereon. For example, the automated components 104 can include barcodes, QR code labels, etc. that can be machine readable via IR scanners, video capture, etc. As would be appreciated by one skilled in the art, the automated complements 104 themselves can be machine recognizable utilizing other or additional object recognition techniques and combinations thereof, including any combination of systems known in the art.

The instrument components 106 can include hardware and software configured to take measurements and monitor other elements within the automated laboratory. For example, the instrument components 106 can include temperature sensors, motion sensors, light sensors (e.g., IR sensors), vibration sensors, video sensors, audio sensors, spectrometers, or any other sensors known in the art. The sensors can include a combination of sensors included within a particular automated laboratory setup and/or supplemented with sensors specifically for use with the present invention. For example, additional sensors for identifying objects, placement of objects, volume of fluid within object, etc. can be included with standard laboratory automation components to make up the instrument components 106. In some embodiments, the instrument components 106 can be configured to communicate data to a computing architecture 110 for additional processing, including, e.g., monitoring a laboratory process or experiment, reconfiguring or troubleshoot a laboratory process, collecting real-time data and laboratory environment status, as well as any other processing and combinations thereof. For example, the instrument components 106 can include any combination of wired, wireless (e.g., WiFi, Bluetooth, etc.) enabled devices with protocols for sharing data to other computing devices.

The labware components 108 can include any combination of non-automated equipment found in an automated laboratory. For example, the labware components 108 can include glassware, trays, plates, test tubes, pipettes, containers, or any other combination of labware known in the art. In some embodiments, the labware components 108 may be recognizable by the computing architecture 110 using, e.g., computer identifiable markers placed thereon. For example, the labware components 108 can include barcodes, QR code labels, etc. that can be machine readable via IR scanners, video capture, etc. As would be appreciated by one skilled in the art, the labware components 108 themselves can be machine recognizable utilizing other or additional object recognition techniques and combinations thereof, including any combination of systems known in the art.

In some embodiments, the system 100 can utilize the mixed reality lab automation computing architecture 110 to provide mixed reality for facilitating interactions within the laboratory environment 102. In particular, the computing architecture 110 can utilize information received from within the system 100 to determine what mixed reality content should be displayed on user devices 124 in a real-time view of the automated laboratory 102. In some embodiments, the computing architecture 110 can include a computing system with specialized software, hardware, and databases designed for providing informative and instructive mixed reality to a user to facilitate interacting with the complex and sophisticated laboratory environment 102. For example, the computing architecture 110 can be software installed on a local computing device 112, a remote centralized computing device 112, a cloud based architecture accessible by other computing devices (e.g., the user devices 124), a web accessible architecture, or the like. However, the computing architecture 110 may instead be incorporated into the user devices 124 for local processing, or a combination of local and cloud systems.

The combination of hardware and software that make up the computing device 112 within computing architecture 110 are specifically configured to provide a technical solution to a particular problem utilizing an unconventional combination of steps/operations to carry out aspects of the present invention. In particular, the computing architecture 110 is designed utilize the computing device 112 to execute a unique combination of steps to provide a novel approach to providing informative and instructive mixed reality to a user within a real-time view of an automated laboratory. This technical solution arises out of problems created by the development and increased use of automated laboratories.

In accordance with an example embodiment of the present invention, the computing device 112 can include a processor, a memory, an input output interface, input and output devices and a storage system 114. The computing device 112 can include an operating system configured to carry out operations for the applications installed thereon. As would be appreciated by one skilled in the art, the computing device 112 can include a single computing device, a collection of computing devices in a network computing system, a cloud computing infrastructure, or a combination thereof. Similarly, as would be appreciated by one of skill in the art, the storage system 114 can include any combination of computing devices configured to store and organize a collection of data. For example, storage system 114 can be a local storage device on the computing device 112, a remote database facility, or a cloud computing storage environment. The storage system 114 can also include a database management system utilizing a given database model configured to interact with a user for analyzing the database data.

Moreover, in some embodiments, the computing architecture 110 can include a combination of core components to carry out the various functions of the present invention using the computing device 112 and storage system 114. For example, some embodiments include the computing device 112 including hardware components, software components or a combination thereof for recognizing automated components 104 and labware components 108, and based on automation protocols and feedback from instrument components 106, assist users. with configuration and monitoring of an automated laboratory process using MR via the user devices 124. In accordance with an example embodiment of the present invention, the computing device 112 of the computing architecture 110 can include an automation protocol module 118 a configuration module 120, and an operation module 122 in communication with a measurement module 116. As would be appreciated by one skilled in the art, the modules 116, 118, 120 and 122 can include any combination of hardware and software configured to carry out the various aspects of the present invention.

In accordance with an example embodiment of the present invention, the computing device 112 may utilize measurements from the measurement module to providing feedback to, e.g., a user at a user device 124 for an MR overlay of the laboratory environment 102 based on a current state in the laboratory environment 102. In some embodiments, the measurement module 116 can receive and/or obtain data from the instrument components in real-time or periodically. For example, the measurement module 116 can be configured to communicate with, aggregate from, and store measurements and other data obtained by the instrument components 106. In some embodiments, the measurements and other data can be stored in the storage system 114 for use by the computer device 112, particularly, the configuration module 120 and the operation module 122.

In one example, the measurement module 116 can be located proximate to the laboratory environment 104 and be communicatively attached to the various instrument components 106 therein. Upon receiving data from the instrument components 106, the measurement module 116 can transmit or otherwise provide said information to the storage system 114 and/or computing device 112.

In another example the measurement module 116 can be remotely located with the computing device 112 and receive the data from the instrument components 106 through a wireless communication means. For example, the instrument components can be internet of things (IoT) enabled devices and can wirelessly transmit data to the measurement module 116 within the computing architecture 110.

In some embodiments, the automation protocol module 118 may be configured for constructing laboratory protocols that include MR instructions for configuration the automated components 104, instrument components 106 and labware components 108 of the laboratory environment 102 to accurately perform an automated laboratory process. In many cases, the equipment, components and settings for even relatively simple automated laboratory processes may be complex and difficult to set-up. To facilitate reliably instructing a user for configuring the laboratory environment 102, a user or administrator or other laboratory professional may design the laboratory process in a simulated environment using, e.g., mixed reality objects.

Accordingly, in some embodiments, the automated protocol module 118 may include, e.g., a library of three-dimensional representations of components, such as the automated components 104, instrument components 106 and labware components 108, as well as template protocols and settings for each component used in each process. A professional may access the computing device 112 to modify the libraries and assemble a protocol. For example, the user may select a deck layout of equipment, assign labware to particular locations in the deck, establish volume requirements of samples, assign liquid types, import metadata related to each piece of equipment, deck configuration, labware component, among other configuration options.

In some embodiments, the metadata may include computer identifiable items such as objects or markers (e.g., QR barcodes) that can be used to associated equipment and components with real-world markers. Thus, in some embodiments, in addition to establish a protocol in the automation protocol module 118, the professional may also establish corresponding physical markers in the laboratory environment 102 to mark component locations, e.g., locations for well plates among other components. Accordingly, in some embodiments, the professional may design the automation protocol to correlate specific equipment to the component locations based on the needs of a given laboratory process. Each automation protocol may then be stored as a preset laboratory configuration in the storage system 114 for access by, e.g., the configuration module 120 and the operation module 122.

In accordance with an example embodiment of the present invention, the configuration module 120 can be configured to provide assistance to a user (e.g., user of a user device 124) with the configuration and/or assembly of the automated laboratory environment 102 by generating MR overlays at the user device 124 based on established protocols configured with the automation protocol module 118. The configuration module 120 can be configured to create and/or provide preset laboratory configurations at the user device 124 based on the automated laboratory equipment being used and the specific experiments being run. The preset laboratory configurations can be stored for providing assistance during laboratory setup. In some embodiments, configuration module 120 can provide assistance by providing instructions to a user in the form of mixed reality elements within a real-time display of the laboratory environment 102 on the user device 124.

Thus, in some embodiments, the configuration module 120 can provide mixed reality content for display on the user device 124 in response to data received from the user device 124. In particular, the configuration module 120 can utilize a combination of data received from the user devices 124 and/or the measurement module 116 to analyze a current configuration and layout of the components 104, 106, 108 within the laboratory environment 102 and determine the mixed reality information to display to the user via the user devices 124 for completing a setup according to the stored preset laboratory configurations.

For example, the configuration module 120 can provide a series of mixed reality overlays in a display of the user device 124 based on components within view of a camera of the user device 124. In particular, the user device 124 may capture imagery of the laboratory environment 102 and recognize the markers placed at locations of the laboratory environment 102. Using the markers, the configuration module 120 may identify a component or substance to be placed at the marker based on the present laboratory configuration for running a selected laboratory process with the automated components 104. The configuration module 120 may then serve an overlay of a corresponding three-dimensional image to the user device 124 overlaying the associated location in the real-world laboratory environment 102 such that the three-dimensional image depicts a step in configuring the laboratory environment 102 for the particular laboratory process.

In another example, if the configuration module 120 reviewed real-time video capture of the laboratory environment 102 and determines that an identified instrument component 106 (or any component) is setup at a wrong location, the configuration module 120 can provide a mixed reality instructional video to be displayed to the user within the real-time display on the user device 124 overlaying a real-world laboratory environment 102 location where said instrument component 106 should be setup. Furthermore, machine learning and image recognition algorithms can be incorporated to identify other issues, for example, incorrect labware, empty tip boxes, or hazards, preventing crashes before they occur.

In accordance with an example embodiment of the present invention, the operation module 122 can be configured to provide information regarding a real-time state of materials, equipment, components and/or data to a user (e.g., user of a user device 124) during operation of the automated laboratory environment 102. In some embodiments, operation module 122 can provide information to a user in the form of mixed reality elements within a real-time display of the laboratory environment 102 on the user device 124.

For example, the operation module 122 can provide mixed reality overlay for display on the user device 124 in response to data received from the user device 124 and the system 100. In particular, the operation module 122 can utilize a combination of data received from the user devices 124, measurement module 116, and/or the operation module 122 to analyze a current configuration and operational state of the components 104, 106, 108 within the laboratory environment 102 and determine the mixed reality information to display to the user via the user devices 124. For example, the operation module 122 can receive data related to outputs from the instrument components 106 (e.g., temperatures, spin rates, incubation times, etc.), as well as other computer identifiable items (e.g., QR barcodes), within the laboratory environment 102 and relay that information in a human readable format to the user via mixed reality text and/or images to be displayed to the user within the real-time display on the user device 124.

In accordance with an example embodiment of the present invention, the system 100 can include one or more of user devices 124 configured to communicate with the computing architecture 110 over a telecommunication network(s) 126. In some embodiments, the computing architecture 110 can act as a host, for each of the user devices 124, providing the functionality of the modules 116, 118, 120 to the user devices 112 while sharing a secured network connection. As would be appreciated by one skilled in the art, the one or more of user devices 124 can include any combination of computing devices, as described with respect to the computing device 112. For example, the computing device 112 and the plurality of user devices 124 can include any combination of servers, personal computers, laptops, tablets, smartphones, virtual reality goggles, etc. In accordance with an example embodiment of the present invention, the computing devices 112, 122 are configured to establish a connection and communicate over telecommunication network(s) 126 to carry out aspects of the present invention. As would be appreciated by one skilled in the art, the telecommunication network(s) 126 can include any combination of known networks. For example, the telecommunication network(s) 126 may be combination of a mobile network, WAN, LAN, or other type of network. The telecommunication network(s) 126 can be used to exchange data between the computing devices 112, 122, exchange data with the storage system 114, and/or to collect data from additional sources.

In some embodiments, the one or more of user devices 124 can include, or otherwise be communicatively attached to a device configured to, capture video in real-time, transmit video to the computing device 112 for analysis, and receive mixed reality enhancements for display within the real-time video. For example, the user devices 124 can include or be communicatively attached to a camera configured to capture video in real time. Additionally, the user devices 124 can include or otherwise be in communication with software (e.g., via a web portal or cloud infrastructure) that communicates with the computing architecture 110 and data can be shared between the user devices 124 and the computing architecture 110. The user devices 124 can be configured to provide real-time information to the computing architecture 110, the computing architecture 110 can perform analysis on the received data, and the computing architecture 110 can provide mixed reality to the user devices 124 for display within the real-time display.

Figure 2:
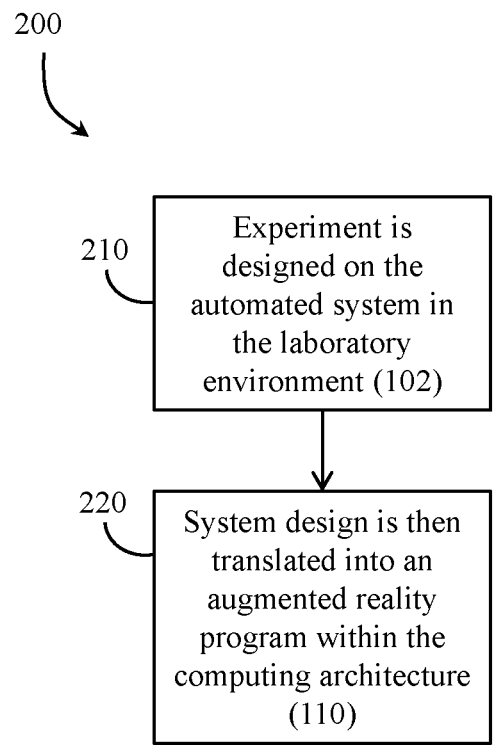
FIG. 2 is an exemplary process for designing experiment protocols for use in accordance with the present invention.

Referring to FIG. 2, an exemplary process 200 for configuring the system 100 to implement augmented reality for use in accordance with the present invention is provided. At step 210, through the computing architecture 110, a user interface can provided to enable an expert user to design and program an experiment protocol for the laboratory environment 102. When designing the protocol, the expert user can define the required automated components 104, instrument components 106, and proper utilization and placement of labware 108 for a particular experiment. The experimental definitions can include positioning (e.g., location, orientation, etc.) for each of the components 104, 106, 108, parameters (e.g., materials, temperatures, quantities, etc.) for those components 104, 106, 108, unique machine identifiable objects associated with those components 104, 106, 108, and augmented reality objects to be associated with any of the machine identifiable objects. As would be appreciated by one skilled in the art, an automated laboratory 102 can be configured for any combination of experiments and each of the experiments would have its own uniquely designed and stored protocol. Once the protocol is designed it can be saved in a database for future use (e.g., editing, sharing, etc.).

Figure 5A:
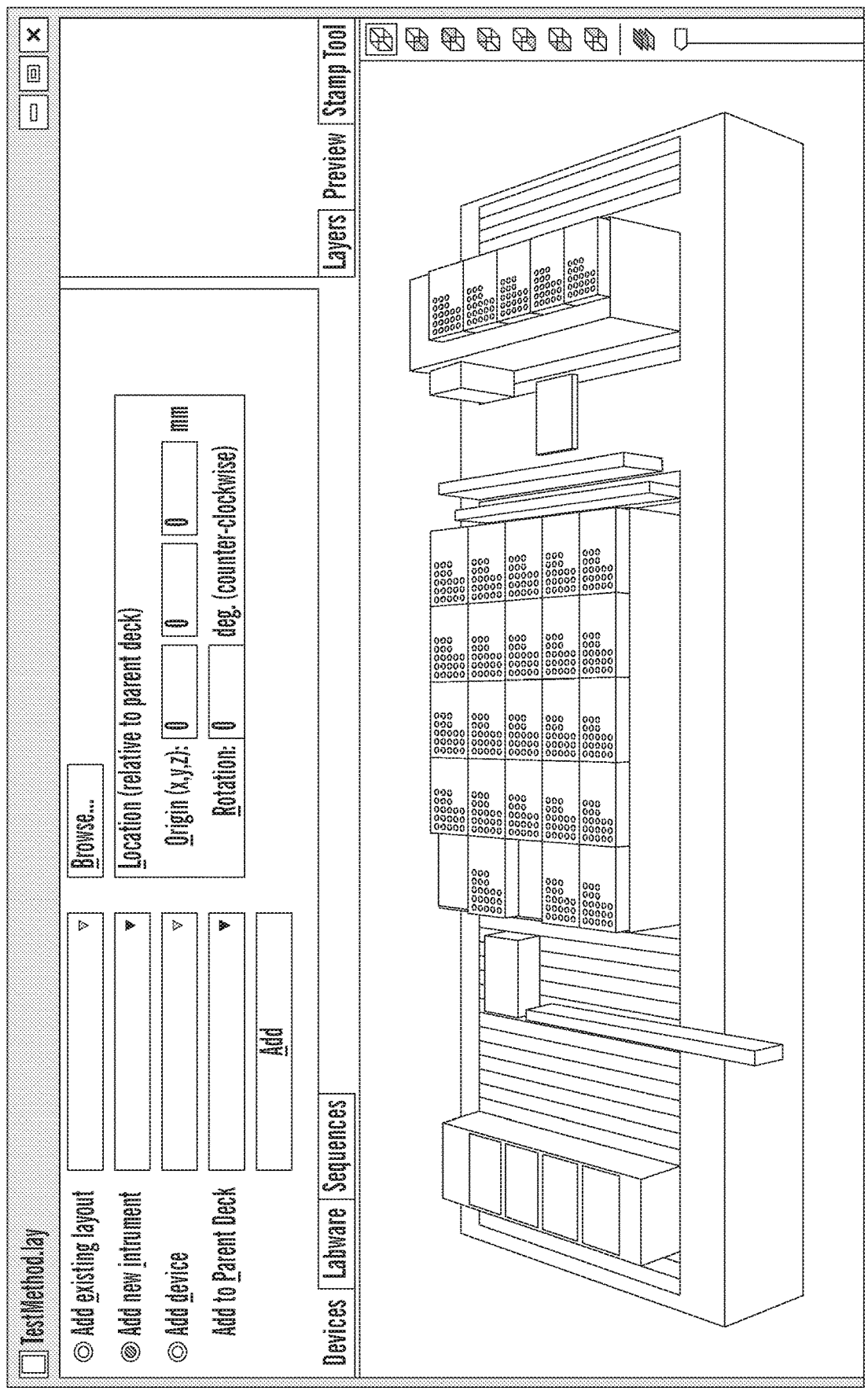
FIG. 5A is an exemplary graphical user interface for designing experiment protocols.

Referring to FIG. 5A, an example experiment protocol design within a graphical user interface (GUI) 500 is depicted. The experiment protocol design GUI 500 can include a combination of windows to assist the expert user in designing an experiment protocol. For example, the experiment protocol design GUI 500 can include a first window for an automation script window for programing rules and methods into the protocol and a second window with the deck layout for the experiment, as shown in FIG. 5A. Using the experiment protocol design GUI 500, the expert user can program experiment protocols by designing the deck layout in the second window including but not limited to assigning labware (e.g., tubes, plates, racks, etc.) and using the first window to assign values to the labware, including but not limited to defining liquid types, volume reequipments, etc. for the labware. Additionally, metadata can be assigned to the labware (e.g., machine identifiable objects).

Continuing with FIG. 2, at step 220 the computing architecture 110 can transform the experimental protocols designed by expert users (step 210) into an augmented reality program within the computing architecture 110 that can be utilized/rendered to a user during laboratory configuration and/or operation. The transformation step can be performed through automated translation utilizing integrated software or through manual intervention. For example, the experiment protocol can be exported to an augmented reality program that generates all of the components from the deck layout on an automation platform for assignment of augmented reality objects. In some embodiments, the deck layout in the augmented reality program can include all the components provided in step 210 positioned at the locations on the deck specified by the expert user.

Figure 5B:
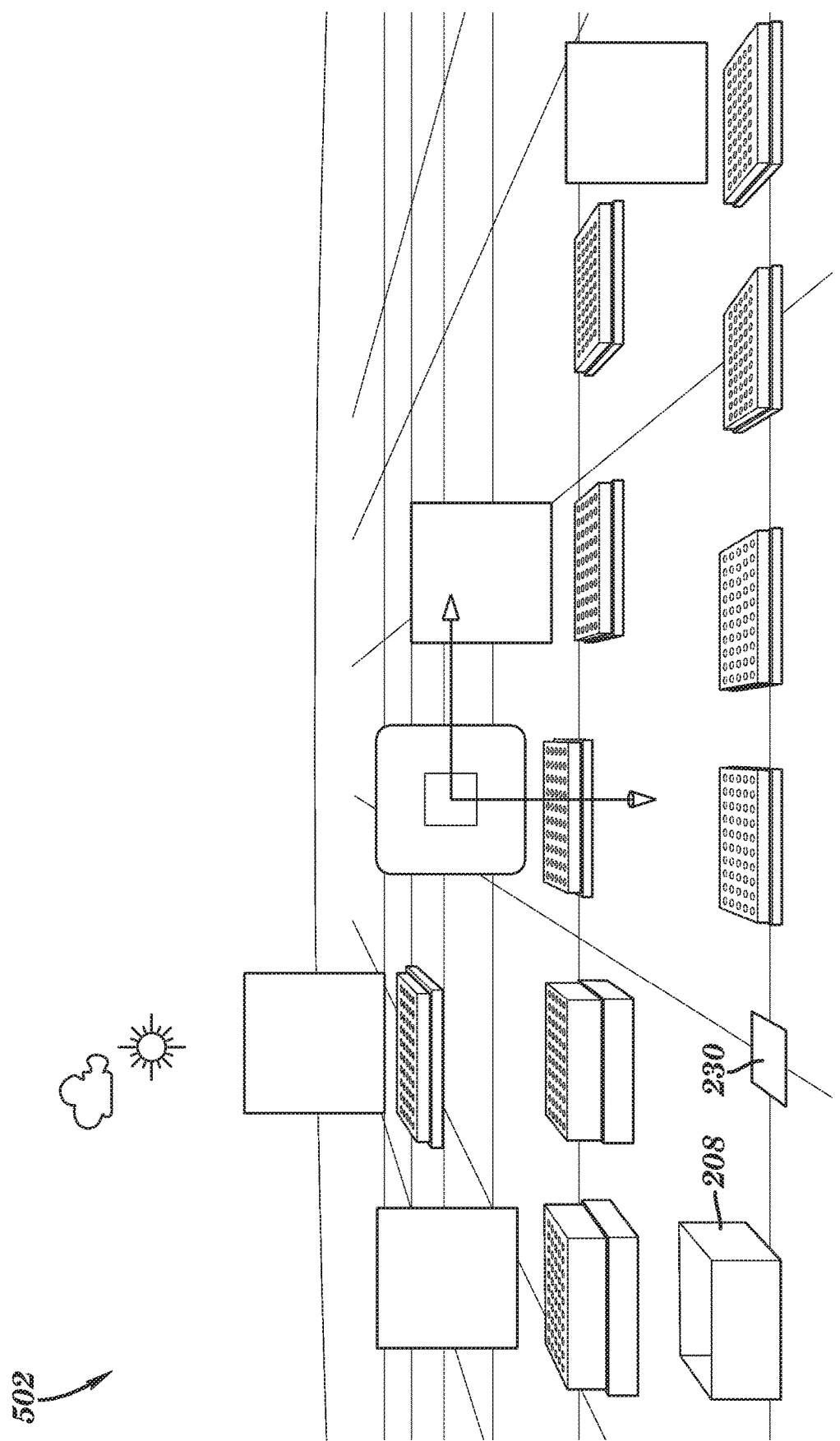
FIG. 5B is exemplary graphical user interface for transforming an experiment protocol in an augmented reality program.

Once in the augmented reality program, each of the labware components on the deck layout can be associated with machine identifiable objects (step 210) which can then be associated with one or more augmented reality objects. For example, the protocol can assign visual markers in the form of QR Codes to each labware component and each of the QR code. FIG. 5B depicts an example graphical user interface 502 including augmented reality objects 240 and machine identifiable objects 230 within the augmented reality program. Codes can be associated with augmented reality objects stored in a database. The visual markers can be automatically generated, assigned, and/or selected by the user from a database. For example, a component identified as a 96 well plate in the experiment protocol from step 210 can be transformed into a three-dimensional image of a 96 well at the specified location on the generated deck platform in the augmented reality program. In some embodiments, a second or more augmented reality objects can be associated with the same component. For example, the 96 well can include a tag that is should include an instructional video, and the appropriate video will be amended to the three-dimensional image of a 96 well as specified in step 210. As would be appreciated by one skilled in the art, the augmented reality can include any combination of images, text, video, notes, prompts, etc. known in the art. Once compiled, the augmented reality program can be linked to one or more user devices 124 for use in accordance with the present invention.

Figure 3:
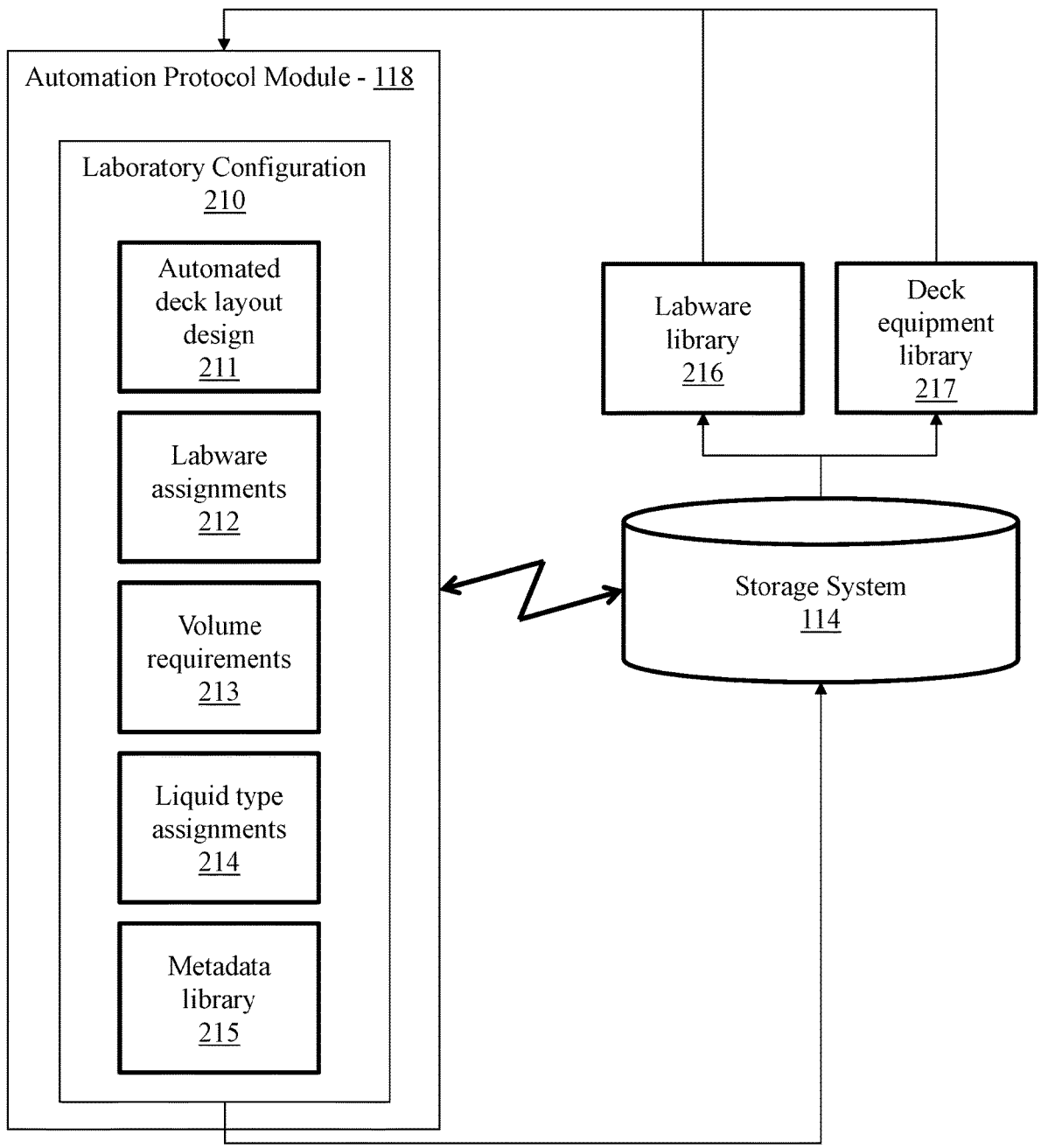
FIG. 3 is an exemplary computing system for implementing the systems and methods of the present invention.

Referring to FIG. 3, an exemplary process for utilizing the computing device 112 and storage system 114 to implement experiment design in the automation protocol module 118.

In some embodiments, the automation protocol module 118 may be configured to perform step 210 from FIG. 2 above to create a laboratory configuration 210 using data received from the storage system 114. For example, the automation protocol module 118 may retrieve from the storage system 114 automation lab equipment and labware information such as, e.g., a labware library 216 having details describing various labware items, and a deck equipment library 217 having details describing automated deck equipment.

In some embodiments, a laboratory process may utilize a variety of automated components 108 that need to be set-up properly to accurately and reliably run the process. In order to provide a user, via a user device 124, with accurate mixed reality instruction regarding the configuration of the automated components 108 in the laboratory process, digital representations of the automated components 108 may be laid out to create a digital representing of an automated deck of equipment for implementing the laboratory process. Thus, in some embodiments, using the labware library 216 and the deck equipment library 217, as well as other possible inputs such as measurement data from the measurement module 116, the automation protocol module 118 may be used to design an automated deck layout 211. Using a configuration graphical user interface (GUI), a user may control the automation protocol module 118 to configure deck equipment from the deck equipment library 217 to create the automated deck layout design 211. For example, the user may design the automated deck layout design 211 to match a real-world configuration of automated laboratory components 104 in the laboratory environment 102.

In some embodiments, in addition to an arrangement or configuration of automated components 106, lab components 108 may also need to be placed in specific locations in order to accurately and reliably execute a laboratory process in the laboratory environment 102. Thus, labware arrangements relative to the automated deck layout design 211 may also be configured. For example, the user may use the automation protocol module 118 to configure labware assignments 212 relative to the automated deck layout design 211. In particular, the use may select labware form the labware library 216 to be located in areas on the automated deck layout of the automated deck layout design 211. For example, the user may drag a representation of a labware component and place it in a graphical location within the configuration GUI corresponding to a location on the automated deck layout design 211. As a result, the laboratory configuration 210 can include a graphical design for where to place labware components on a deck layout to represent locations in the real-world configuration of the automated components 104 in which a user may be instructed to place lab components 108 based on the labware assignments 212 in the laboratory configuration 210.

In some embodiments, the laboratory configuration 210 may also include information for setting sample volumes for the labware of the labware assignments 212. During the real-world laboratory process, the automated components 106 may be set to fill laboratory components 108 in a given location with a particular amount of a sample, or lab components 108 to be placed in a given location may need to be placed there with a particular amount of sample. These volume requirements 213 may be established and added to the laboratory configuration 210 via the automation protocol module 118 using, e.g., the configuration GUI.

In some embodiments, a particular laboratory process may also depend on liquid types provided to the automated components 106 and lab components 108, such as, e.g., solutions, samples, reagents, among other liquids. Thus, in designing the laboratory configuration 210 with the automation protocol module 118, a user may provide liquid type assignments 214 to various components in the configuration GUI. For example, a user may assign a particular solution to a particular labware assignment 212, such as, e.g., a well plate including a 96 well plate assigned to a particular automated component of the automated deck layout design 211. Thus, an automated laboratory protocol can be designed end-to-end using the automation protocol module 118, including the layout of automated components, selection and locations of labware, volume requirements and fluid types from start to finish of the laboratory process.

In some embodiments, to facilitate matching requirements and assignments of the laboratory configuration 210 to the real-world configuration of automated laboratory components 104 in the laboratory environment 102 for, e.g., mixed reality rendering of set-up guides via the user device 124, the automation protocol module 118 may load a metadata library 215 for each requirement and assignment, e.g., from the storage system 114, e.g., in the labware library 216. In some embodiments, the metadata can include data identifying computer readable location markers such that labware, volumes and liquids can be correlated to the computer readable markers provided in the laboratory environment 102.

In some embodiments, the laboratory configuration 210 can be saved and stored in the storage system 114 for use by, e.g., the computing device 112 including the configuration module 120 and the operation module 122. Thus, a user may select the laboratory configuration 210 when setting up the laboratory environment 102 for an associated automated laboratory process.

Figure 4:
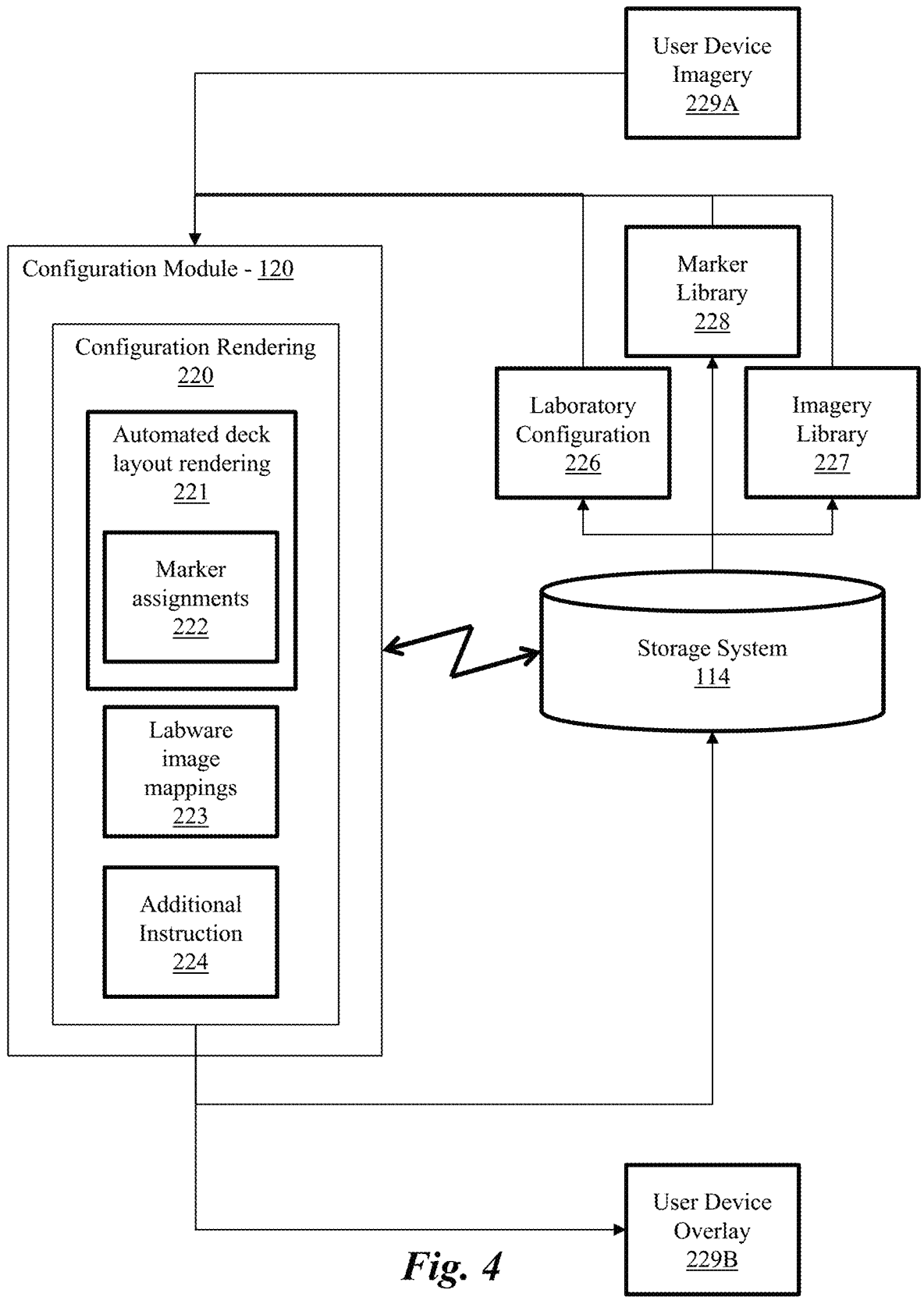
FIG. 4 is an exemplary computing system for implementing the systems and methods of the present invention.

Referring to FIG. 4, an exemplary process for utilizing the computing device 112 and storage system 114 to implement augmented reality program in the configuration module 118.

In some embodiments, a laboratory configuration 226, such as the laboratory configuration 210 designed in the automation protocol module 118 above, can be used by the configuration module 120 to render mixed reality or augmented reality elements. In some embodiments, the elements can include graphical overlays to display at the user device 124 to depict physical steps to take in the laboratory environment 102 to establish an automated laboratory protocol.

In some embodiments, the configuration module 120 may receive the laboratory configuration 226, either from the storage system 114, or as exported directly from the automation protocol module 118. Using the automated deck layout design 211, the configuration module 120 may render each component of the automated platform in the laboratory environment 102 as a 3D virtual object for use in mixed reality devices such as the user devices 124. In some embodiments, the configuration module 120 translates configuration scripts, data, parameters, and other information into the virtual objects using a suitable rendering engine for rendering mixed reality object, such as, e.g., the Unity™ engine, or other suitable engine. Included in the rendering of the automated deck layout 221 may be assignments for visual markers 222 based on, e.g., the labware assignments 212 as described above. In some embodiments, the labware of the labware assignments 212 can be linked to visual markers 222 based on where the labware is assigned relative to the automation deck layout. The visual markers may mark the position and/or component at which the labware is assigned, and thus may serve as an object in the configuration rendering 220 to provide a computer readable marking for identifying the labware assignments 212.

In some embodiments, the configuration module 120 may use the labware assignments 212 and labware imagery to map labware, e.g., lab components 108, assigned in the laboratory configuration 226 to 3D imagery depicting the labware. In some embodiments, the labware imagery may be provided by a pre-rendered set of 3D labware images for mixed reality environments maintained in an imagery library 227 in the storage system 114. Based on, e.g., metadata, tags, labels, names or other details and parameters of each labware assignment code in the laboratory configuration 226, a corresponding labware model can be selected form the imagery library 227 and mapped to the labware assignment 212. Because each labware assignment 212 is also correlated with a marker via the metadata library 215 and the marker assignments 222, the labware image mappings 223 can be used to determine where in the laboratory environment 102 to overlay a rendering of each labware component 108 for instructing a user.

For example, in some embodiments, the configuration module 120 may receive user device imagery 229A captured by an image sensor in the user device 124. Where the user device imagery 229A includes an image of a visual marker (e.g., a QR code) in the laboratory environment 102, the configuration module 120 can reference automated deck layout rendering 221 and marker assignments of the configuration rendering 220. Using the marker assignment 222 associated with the imaged visual marker, the configuration module 120 can select the corresponding labware image mapped to that marker and provide the labware image to the user device 124 display as a user device overlay 229B. Once sent to the display, the user device 124 may display the labware image in a location on the display that intersects the user's field of view and the visual marker in the laboratory environment 102 to overlay an animation of the appropriate labware component 108 in the location to which the labware component 108 is needed for the selected automation protocol. For example, where an automation protocol has been designed that requires a 96 well plate to be placed on a particular automated component 106, upon capturing an image of the corresponding visual marker on the automated component 106, the configuration module 120 may provide an animation to the user device 124 as a user device overlay 229B including a 3D model of the 96 well plate being positioned onto the automated component 106.

Moreover, the configuration module 120 may also utilize additional instruction 224 of the configuration rendering 220 to further instruct the user on placement and configuration of the labware components 108 and automated components 106. In particular, the configuration rendering 220 can include, e.g., additional instruction 224 based on, e.g., volume requirements 213, liquid type assignments 214, and other automation protocol parameters to effectuate a particular automation protocol for a laboratory process. For example, upon rendering an instructive animation for the placement of a particular labware component 108, the configuration module 120 may also provide overlay instruction in a user device overlay 229B, e.g., via textual description or an animation, regarding the volume of a particular fluid with which to fill the labware component 106. Similarly, the additional instruction 224 may include overlay instructions in a user device overlay 229B for inputting settings into an interface of automated components 106, such as, e.g., aliquoting settings, system control system, iterations of an operation, among other settings, e.g., via textual description or an animation.

Figure 6:
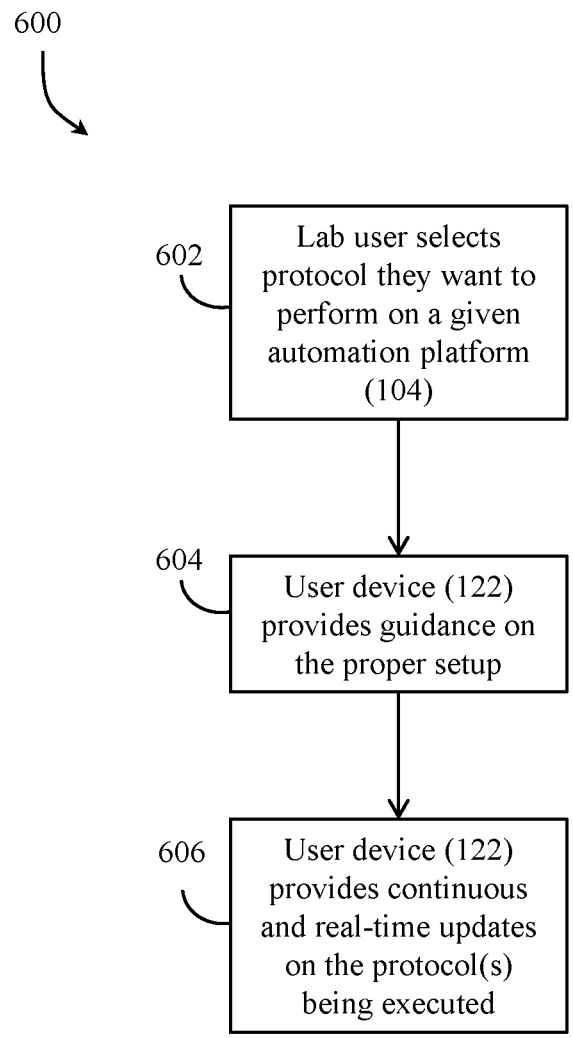
FIG. 6 is an exemplary process for configuring an automated laboratory using the system and methods of the present invention.

Referring to FIG. 6, an exemplary process 600 for utilizing the system 100 to implement the augmented reality for in the laboratory environment 102. In particular, the steps of process 600 provide augmented reality objects to a user device 124 to assist in the proper setup of an automated laboratory for a particular experiment protocol. Initially, the user device 124 can communicate with the computing architecture 110 to receive the necessary information and content for utilization within the laboratory environment 102. The communication can include synchronizing and updating with the latest laboratory layouts, experiment protocols, augmented reality objects, etc. to be generated to the device. As would be appreciated by one skilled in the art, any combination of data can be preloaded into the application running on the user device or downloaded and/or rendered in real-time from data stored remotely on the computing architecture 110.

In some embodiments, there can be multiple user device 124 communicating within the in the laboratory environment 102 communicating and sharing data with the computing architecture 110. For example, the laboratory environment 102 can include a computing device responsible for the automated function of the robotics within the laboratory environment 102, which will need to download the aspects of the experiment protocol responsible to providing instructions to the robotics during operation of the experiment. Similarly, a user can have a portable computing device for viewing the laboratory environment 102 and receiving augmented reality feedback for setting up the laboratory environment 102 and during operation of the experiment, which will need to download augmented reality and render it in a real-time view of the laboratory environment 102.

At step 602, using a user device(s) 122 with access to the programming of the present invention, the user selects to automated protocol they would like to execute in the laboratory environment 102. Selecting the automated protocol can include presenting the user with a graphical user interface with options for different automated laboratory equipment and/or specific experiment to be run. Each of the options can be customizable by the user based on their equipment and experimental preferences. In some embodiments, the system 100 can adjust the content being provided to the user based on the user selections.

At step 604, in response to detecting machine identifiable objects 230 (e.g., QR Codes) augmented reality content is rendered on the user device (122) at the locations of the machine identifiable objects 230. In some embodiments, the augmented reality displayed to the user via the user device 112 can provide guidance and real-time feedback on how to properly set-up the experiment protocol within the given laboratory environment 102. The user device 124 can utilize the unique machine identifiable objects 230 as anchors, projecting images, texts, video, or other visual cues at those locations to facilitate the proper setup of the target object or location including the machine identifiable objects 230, as discussed in greater detail with respect to FIGS. 7A-7J.

In some embodiments, the user device 124 can also be provided with feedback on improperly placed objects and warns the user of potential issues which could result in instrument crashes, safety hazards, and/or incorrect data generation.

At step 606, after setup of the laboratory environment 102 is complete and the automated experiment has been started, the user device 124 can provide real-time updates to the user through a continuous connection between the laboratory environment 102, the measurement module 116 communicatively attached to the computing architecture 110, and the user device 124 itself. These real-time updates can include augmented reality overlays that alert the user of system failures or errors, scheduled user interventions, instrument data (i.e. temperature, volume, sample ID), or other visual representations which would facilitate the execution of the protocol.

In some embodiments, the computing architecture 110 can operate in conjunction with the user device 124 to display mixed reality content 240 to assist the user setting up and configuring an automated laboratory environment (e.g., via the configuration module 120) using process 200 and/or provide additional insight during operation of the automated laboratory environment (e.g., via the operation module 122) using process 600.

In operation, as discussed herein, the user can utilize the user device 124 to capture a real-time image/video of a laboratory environment 102 and receive mixed reality content 240 to be displayed within said real-time image/video to convey particular information to the user. In some embodiments, the configuration module 120 can include preprogrammed instructions and configurations for one or more automated laboratory setups and configurations. Initially, based on the real-time view of the automated laboratory 102, the configuration module 120 can provide users with step by step installation and configuration instructions through the display of mixed reality content within the real-world view on the user device 124. For example, based on the received machine identifiable objects 230 the configuration module 120 can identify augmented reality installation to be transmitted to the user device 124 for display within the real-world view on the device 122 at locations of the machine identifiable objects 230. In some embodiments, the configuration module 120 can provide mixed reality view for locations and installation instructions for each of the components 104, 106, 108 within an empty lab space. For example, a user can provide a real-time view of an empty lab space (e.g., room, tray, container, etc.) and the configuration module 120 can determine where the appropriate components 104, 106, 108 should be installed and provide that information to the user via mixed reality content rendered within the real-time view of the lab space.

Referring to FIG. 7A, an exemplary image of an automated laboratory 102 environment is depicted. The example automated laboratory 102 in FIG. 7A includes a combination of automated components 104, labware components 108 (e.g., plates with test tube trays), and locations with machine identifiable objects 230 located thereon. In some embodiments, the machine identifiable objects 230 can be view by user devices 124 and can be used to identify specific locations, components, etc. such that they can be recognized and utilized as inputs for the system 100. For example, the machine identifiable objects 230 can be associated with locations in which particular labware components should be placed. The machine identifiable objects 230 can also identify components that the system 100 will monitor and track during operation, or can include spaces in which no objects or obstructions should be present, such that if the system 100 cannot locate a particular machine identifiable objects 230, it will notify the user that an error in the setup is present.

Figure 7B:
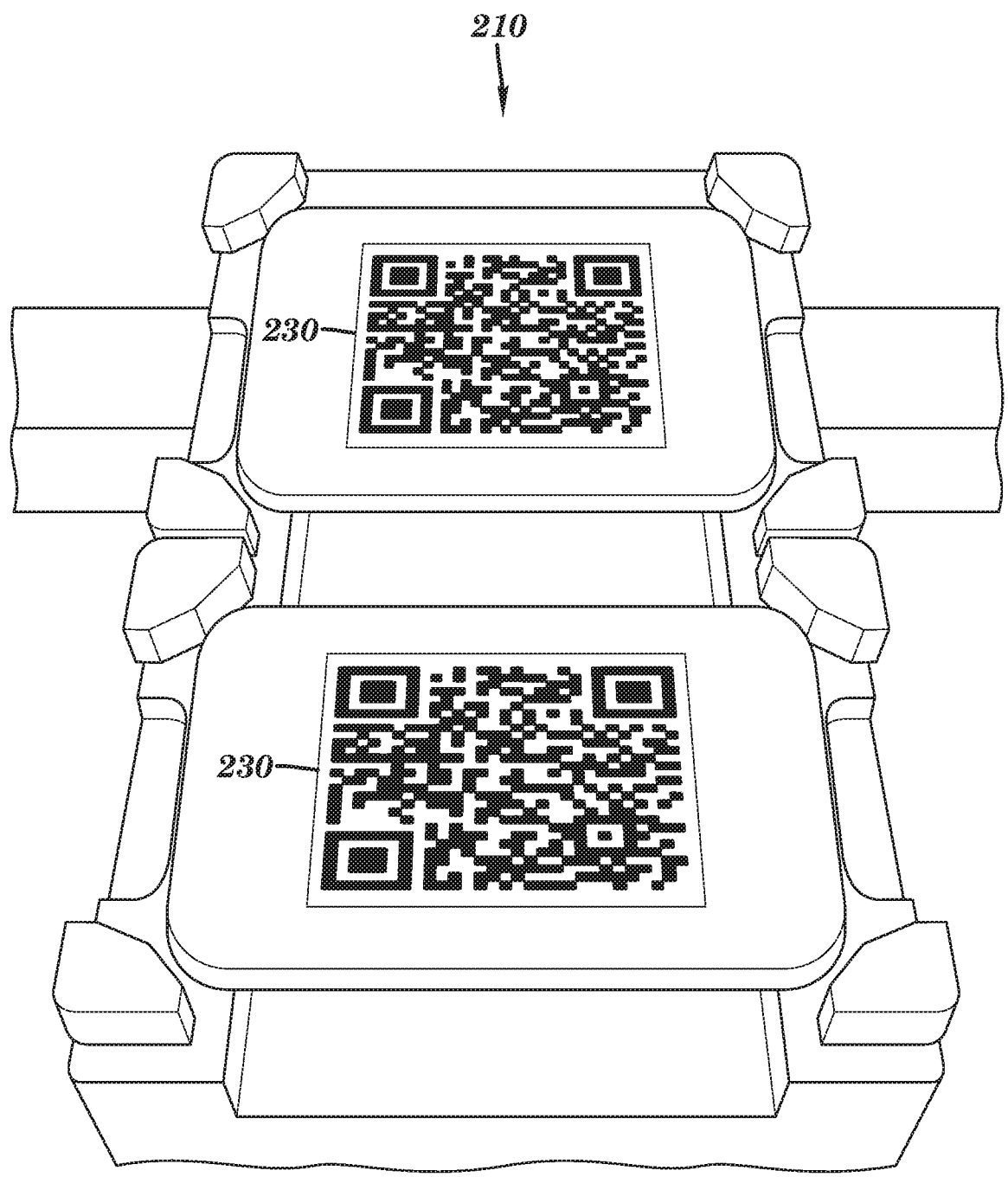
Figure 7C:
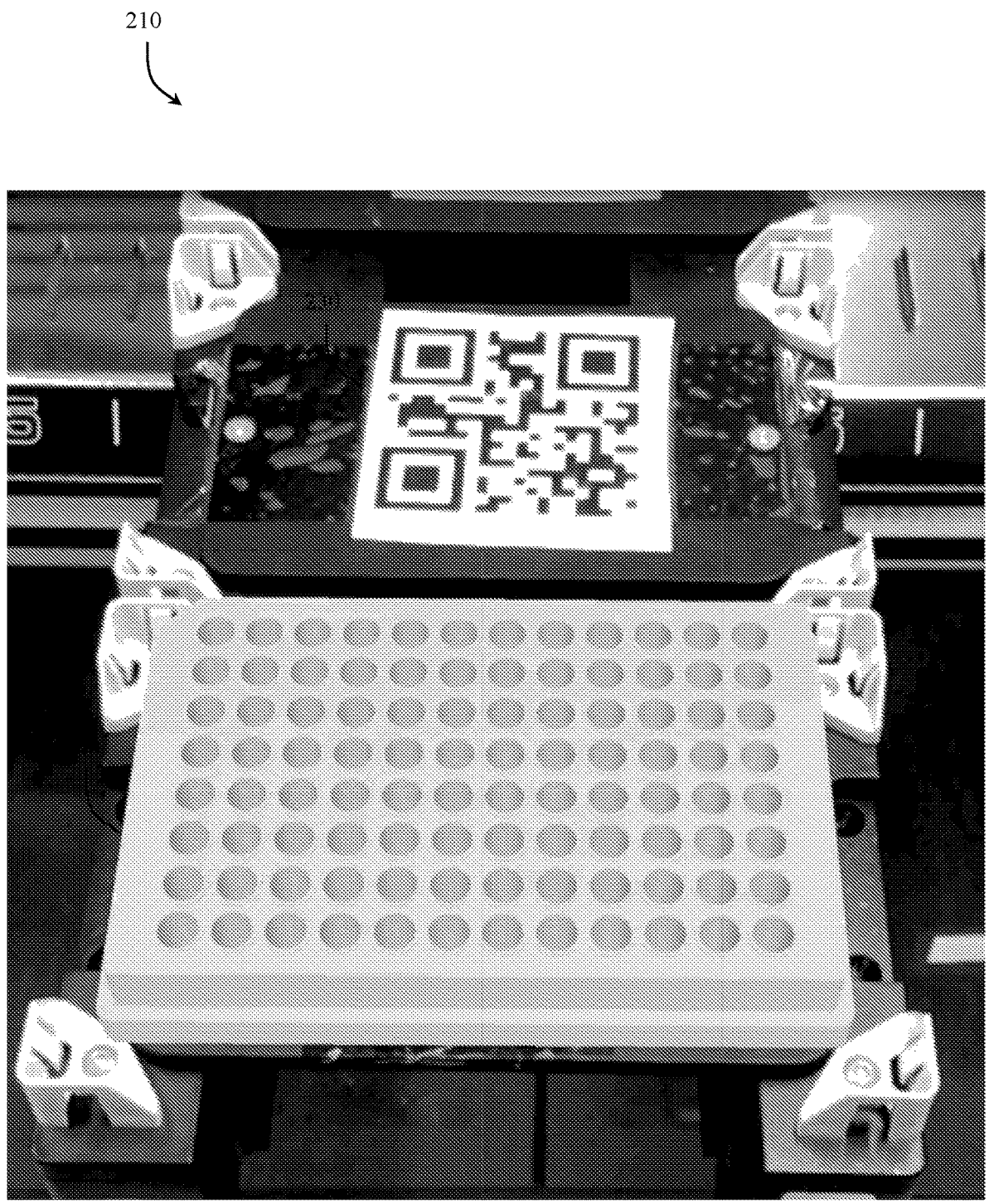

In some embodiments, augmented realty objects will be rendered over any recognized machine identifiable objects 230 to assist a user in the setup and operation of the automated laboratory 102. To determine the mixed reality content 240 to be conveyed, the user device 124 can first transmit at least a portion of the captured real-time image/video to the computing architecture 110 for analysis. Referring to FIG. 7A-7C, in some embodiments, the captured image/video can include unique machine identifiable objects 240 (e.g., barcodes) that can be associated (computing architecture 110) with mixed reality objections (e.g., augmented reality, virtual reality, etc.). The user device 124, or software thereon, can be configured to identify the unique machine identifiable objects 230 and transmit them to the computing architecture 110 for analyses and/or retrieval of augmented reality content 240. For example, as depicted in FIG. 7B an exemplary laboratory environment 210, or subset thereof, can include two-dimensional Quick Response Code (QR Codes) associated with one or more items within the laboratory environment 210. As would be appreciated by one skilled in the art, the present invention can also use any combination of image recognition in addition to or in place of the machine identifiable objects 230 without departing from the scope of the present invention.

In some embodiments, in response to receiving data from the user device 124, the computing architecture 110 can analyze any machine identifiable objects 230 (or image recognition) and determine whether those objects are associated with mixed reality content 240 stored in the storage system 114. The association can be determined by searching a lookup table or other database to see if a mixed reality content 240 is associated with the received data. In instances in which there is mixed reality content 240 associated with data received from the user device 124, the computing architecture 110 can determine what mixed reality content 240 is to be displayed and how it is to be displayed. Thereafter, the computing architecture 110 can be configured to package the mixed reality content 240 and instructions for the user device 124 for displaying the mixed reality content 240 in the real-time image/video and transmit the package to the user device 112 for rendering.

Figure 7D:
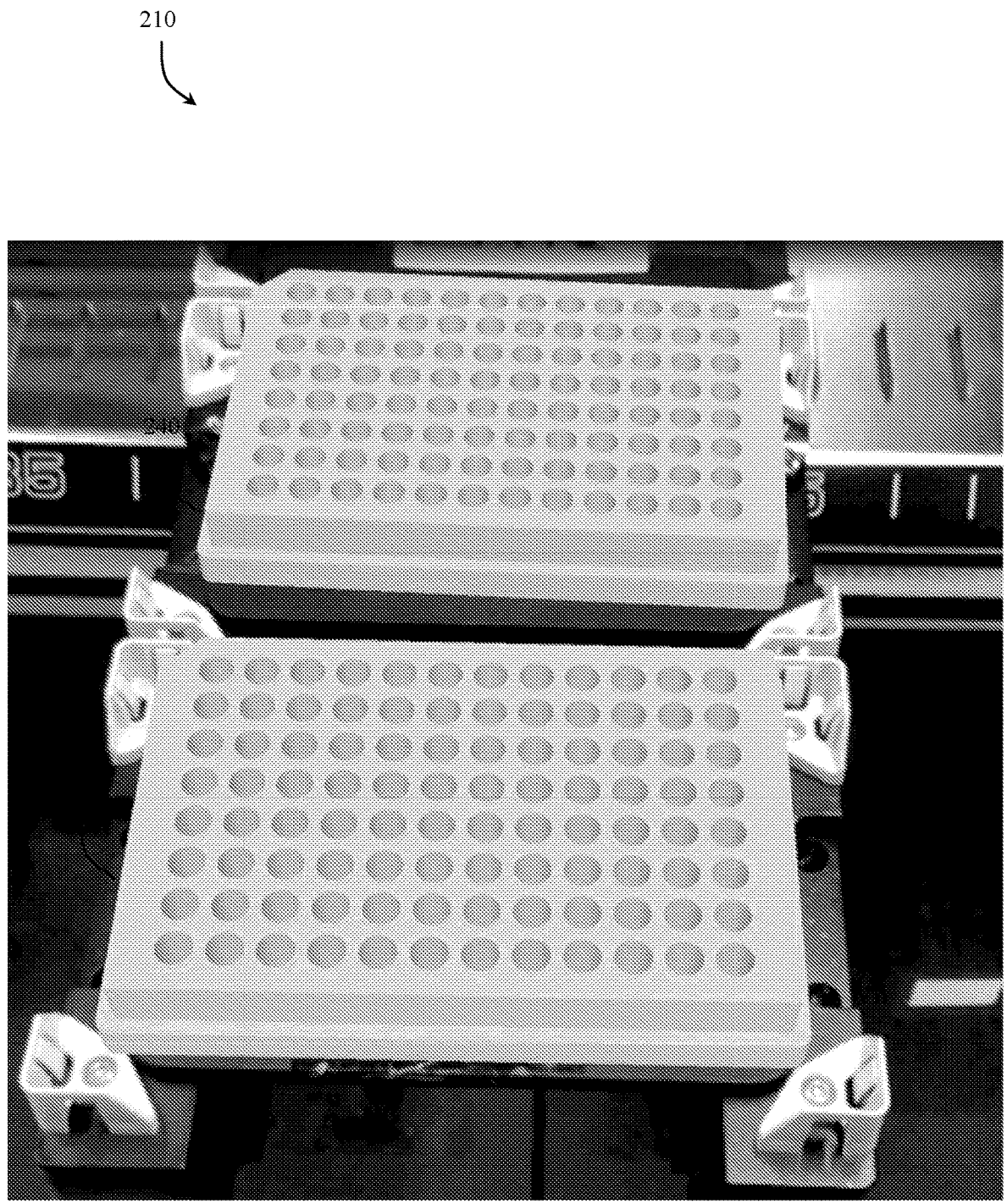
Figure 7E:
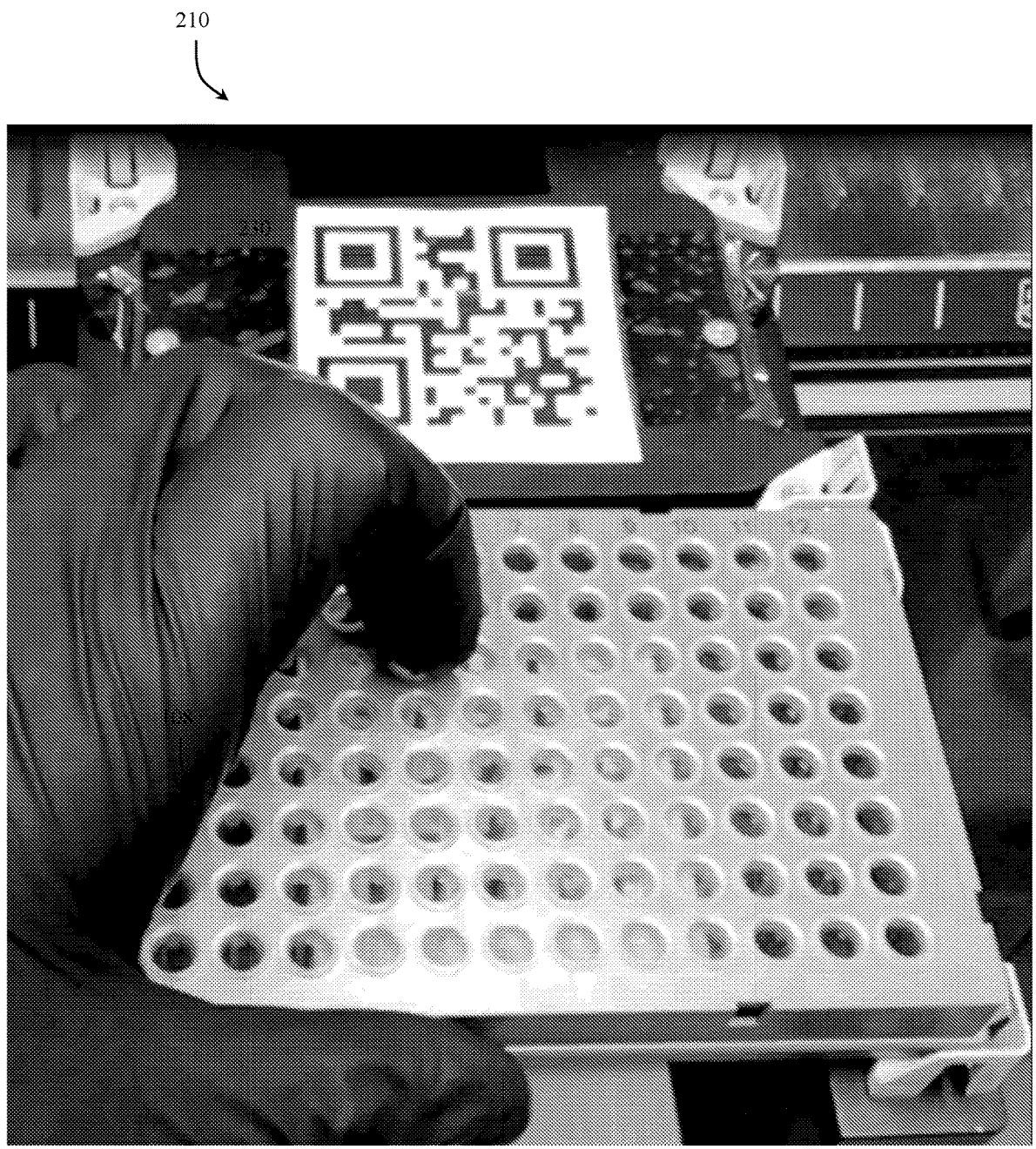
Figure 7F:
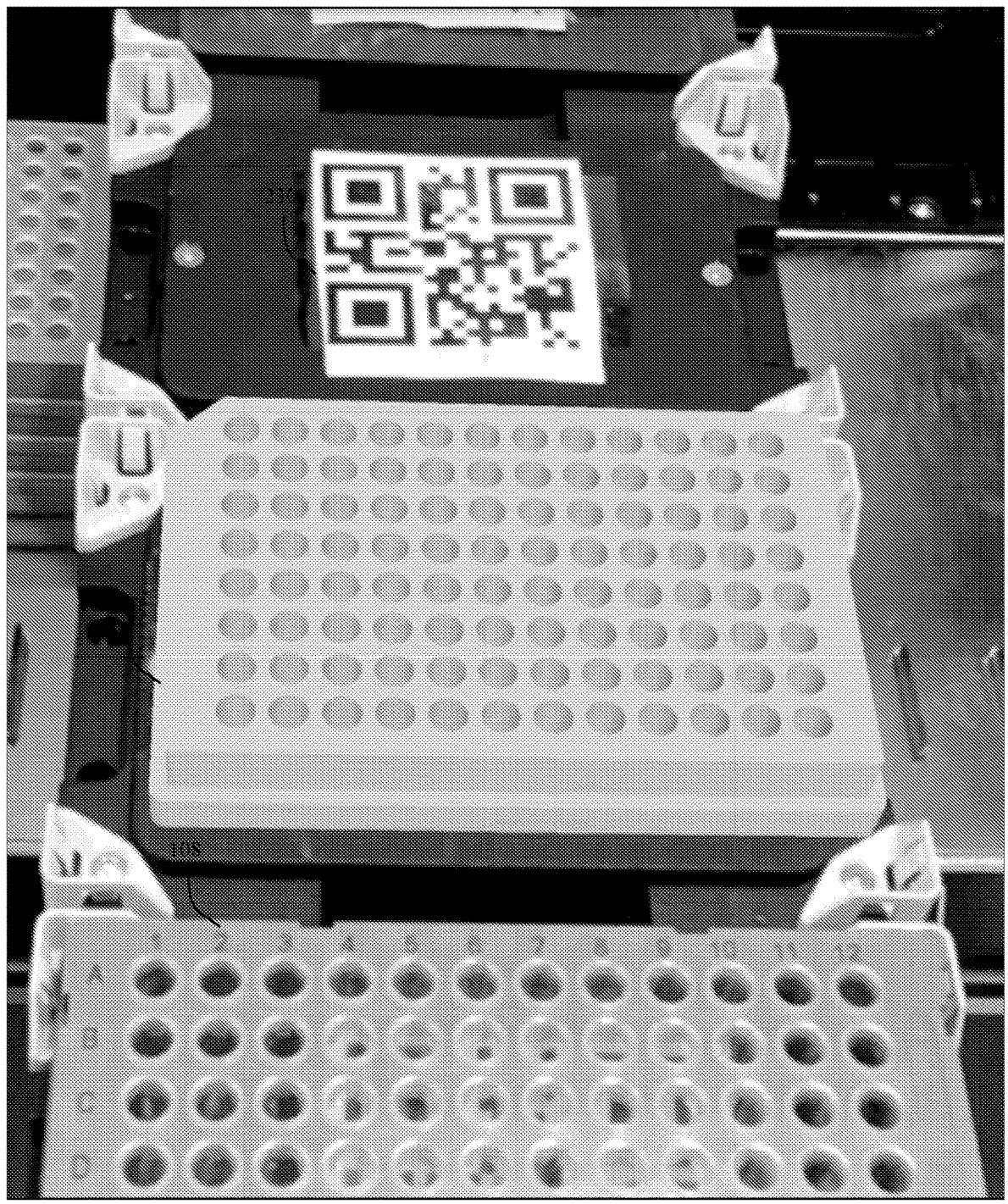

Referring to FIG. 7C, an illustrative example of mixed reality content 240 that can be rendered in association with a machine identifiable objects 230 from FIG. 7B is depicted. In this example, a three-dimensional rendering of a well plate is rendered, indicating to the user the specific labware that should be placed at the particular location. Similarly, referring to FIG. 7D, upon recognition of the second machine identifiable object 230 from FIG. 7B, a second three-dimensional rendering of a well plate is rendered at the second location. As would be appreciated by one skilled in the art, based on the particular machine identifiable object 230 recognized, the computing architecture 110 can determine that a combination of image, video, text, and three-dimensional objects should be displayed at the respective locations of the machine identifiable objects 230 within the real-time image/video for the laboratory environment 210. In some embodiments, as depicted in FIGS. 7C and 7D, the mixed reality content 240 can be rendered at the locations of the machine identifiable objects 230, effectively covering the machine identifiable objects 230 from the view of the user. Alternatively, the objects can be rendered with translucently as to not completely cover the machine identifiable objects 230 from view of the user (e.g., to act as a reference point) or a combination thereof Referring to FIG. 7E the user can place the labware component 108 matching the mixed reality content 240. In this example, the three-dimensional well plate rendered in FIGS. 7C and 7D is replaced by the user with the real-world well plate matching the three-dimensional well plate at the same location as the three-dimensional well plate. Referring to FIG. 7F, a view of the laboratory environment 102 is depicted in which a labware component 108 has been placed, an augmented reality object 240 has been rendered indicating labware that needs to be placed, and a machine identifiable objects 230 that has not yet been recognized/associated with an augmented reality object 240 is provided. FIG. 7E provides representations for how the present invention progresses from a machine identifiable objects 230, to rendering an augmented reality object 240, and concluding with a user having placed the appropriate labware component 108.

Figure 7G:
Figure 7H:
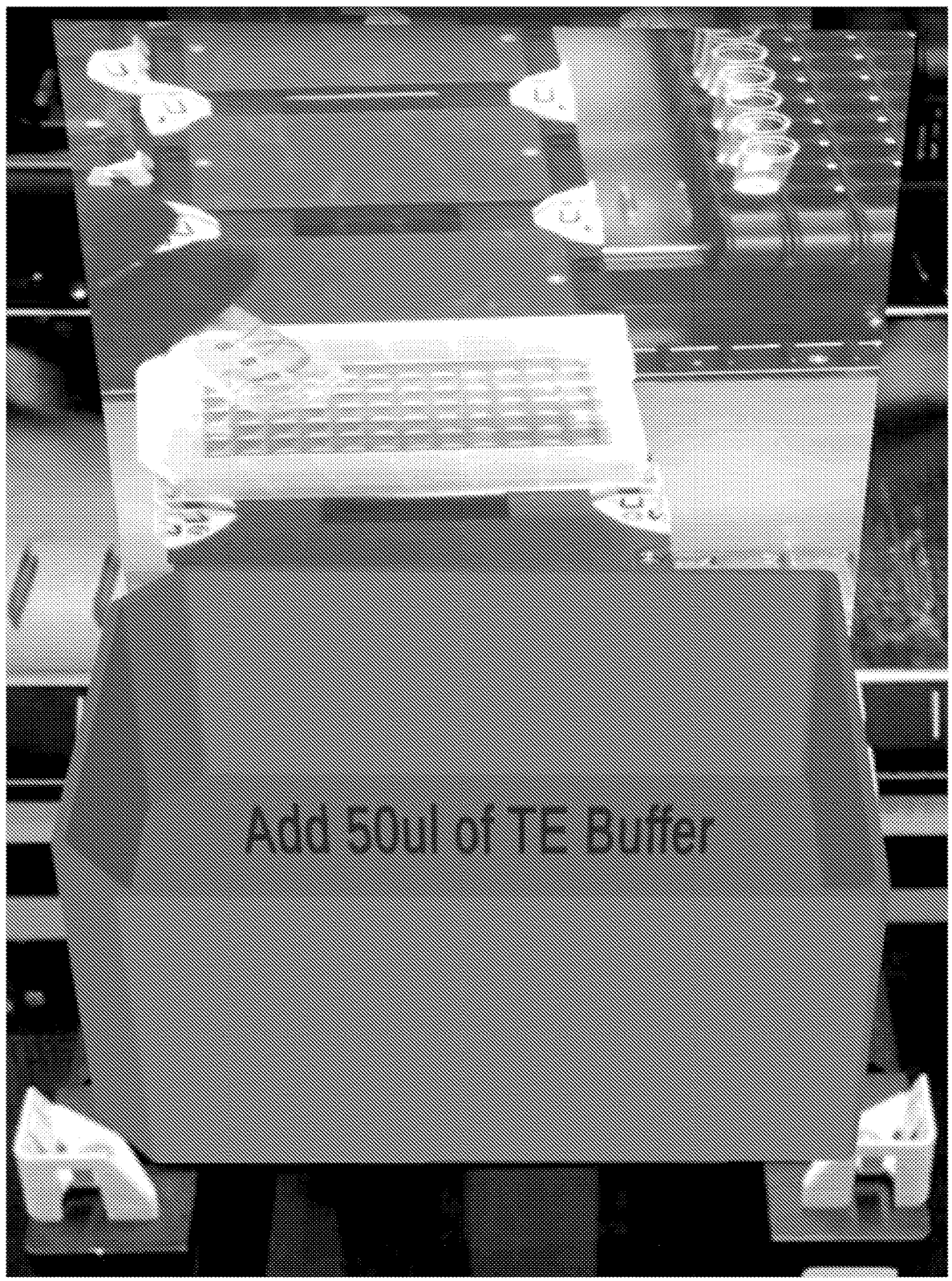

Referring to FIG. 7G, another example augmented reality object 240 can be rendered in place of a machine identifiable objects 230. In some embodiments, the augmented reality object 240 can include placement of a labware component that requires additional steps from the user before setup is complete. The additional steps can be presented to the user in multiple formats, including but not limited to, text, images, video, audio, or a combination thereof. As shown in FIG. 7G a three-dimensional rending of a reservoir is provided along with text indicating to the user to add 50 µl of TE Buffer. In some embodiments, multiple augmented reality objects 240 can be rendered in place of a single machine identifiable objects 230. Referring to FIG. 7H, a three-dimensional rending of a reservoir is provided along with text indicating to the user to add 50 ul of TE Buffer along with a video that can play to show the user how to fill the reservoir.

Figure 7I:
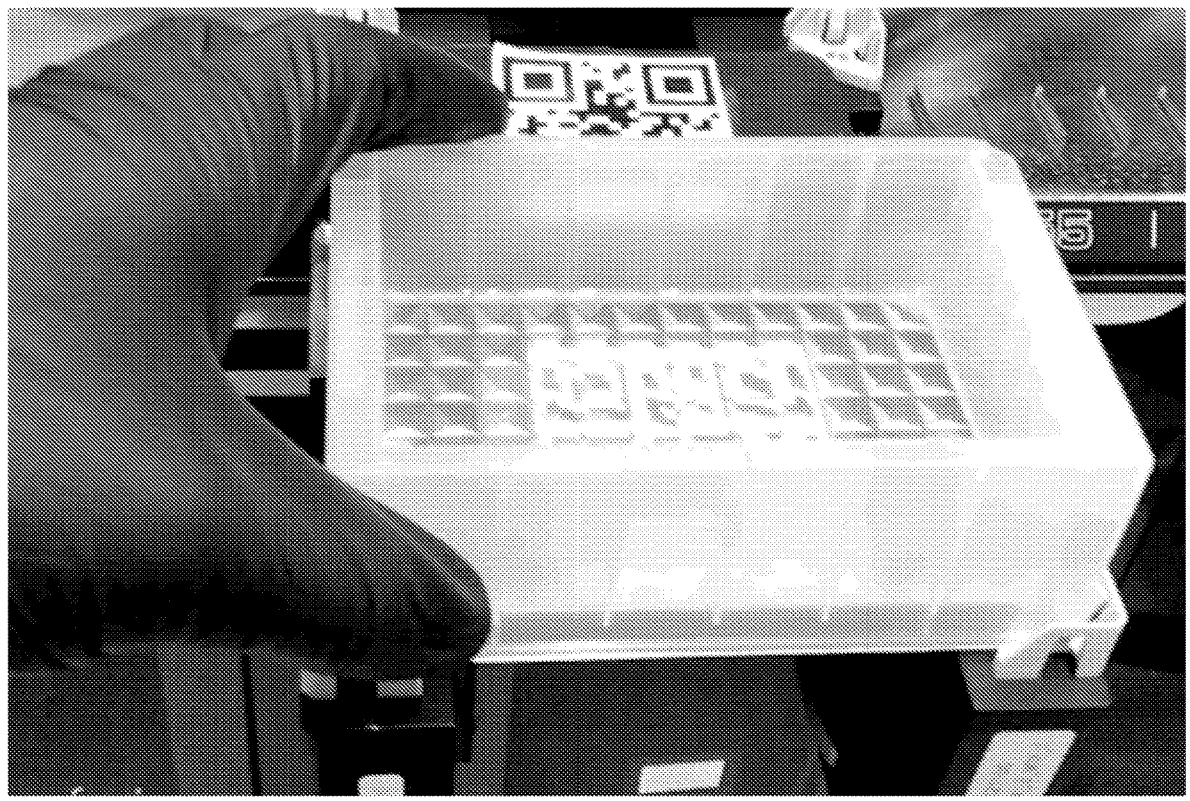
Figure 7J:

Referring to FIGS. 7I and 7J a user can place the labware component 108 provided in FIGS. 7G and 7H and fill the labware component 108 with the appropriate material. In this example, a reservoir is placed by the user, as shown in FIGS. 7I, and 50 µl of TE Buffer is added to the bin, as shown in FIG. 7J. As each instruction is followed by the user and components 104, 106, 108 are properly setup, the configuration module 120 can continue provide the augmented reality content (e.g., video, location, etc.) as machine identifiable objects 230 are recognized at the different locations and the user can repeat the above steps until the automated laboratory is completely setup and/or configured for the experiment protocol.

In some embodiments, based on the data received from the user device 124, the configuration module 120 can analyze the received machine identifiable objects 230 along with other elements within the automated laboratory environment and determine whether components 104, 106, 108 are installed at the appropriate locations and whether the appropriate steps were taken in setting up those objects (i.e., the proper amount of fluid was added). In the event that one or more components 104, 106, 108 are not installed at the appropriate locations, the configuration module 120 can provide mixed reality content 240 to the user in the form of warnings or alerts to display how said components 104, 106, 108 should be installed. In some embodiments, the configuration module 120 can also identify other objects that do not belong within the automated laboratory space and issue a warning to the user that those objects may interfere with operation of the laboratory. For example, the configuration module 120 can use image recognition technology to identify any components that are not recognized and/or are located improperly within the automated environment.

With respect to the operation module 122, it can provide users with additional information during operation of the automated laboratory. The operation module 122 can be configured to monitor objects within the automated laboratory environment to ensure that the automated laboratory 102 is operating as intended and provide real-time feedback to the user as to what is occurring at each stage within the operation. In some embodiments, the operation module 122 can aggregate data related to the real-world display on the user device 124 and data from the measurement module 116 and determine what mixed reality content to display on the user device 124. In some embodiments, the user can customize what data to be displayed. The aggregated data can include a combination of received machine identifiable objects 230 from the user device 124, image recognition data, and received measurement data (from the measurement module 116. Real-time updates can include timers, sample volumes, sample IDs, transfer volumes, intervention instructions.

In some embodiments, the operation module 122 can associate different mixed reality content with the same identifiable objects used by the configuration module 120. For example, with respect to the labware components 108, the configuration module 120 can displayed augmented videos for where to setup the labware while the operation module 122 can display augmented images or text displaying information related to the labware items themselves. For example, the operation module 122 can associate mixed reality identification information for what is in test tubes and display that information to the user in real-time. Additionally, the operation module 122 can display measured information for those test tubes, for example, temperature provided by the instrument components 106. This can assist a user to both know what is happening within the automated laboratory at a particular point in time as well as provide additional insight that a user would not otherwise be able to glean by watching operation of the laboratory without the mixed reality information.

In some embodiments, the operation module 122 can also track and store historic data about the operations being performed within the automated laboratory 102 via data received from the measurement module 116. For example, the operation module 122 can track temperature data throughout an experiment and display the results to a user in an augmented environment. In some embodiments, the operation module 122 can provide feedback to the user based on an analysis of the historic data. For example, the operation module 122 can identify when an experiment is not running as normal and can provide a mixed reality warning to the user to warn that something may not be operating as intended to potentially avoid running the experiment in its entirety when it is not correct.

In some example embodiments, the configuration module 120 and the operation module 122 can be configured to project different mixed reality content for different purposes for different circumstances. For example, the configuration module 120 can project intended labware components 108 onto a deck to facilitate proper placement, integrate video segments to provide granular instructions for setting up the laboratory environment 104 as necessary, provide mixed reality demonstrating how to place labware components 108, highlight sample wells that need controls or other attention, provide alerts if labware components 108 are placed in incorrect locations, project data above samples to identify information about the samples (e.g., concentrations, sample IDs, volume, etc.), and provide holograms highlighting the source of errors within the operation of the automated components 104 or instrument components 106 (e.g., warning sign of a crash, missing tip box, etc.). As would be appreciated by one skilled in the art, any combination of mixed reality content can be provided to a user that may be useful in a particular laboratory environment.

The use of mixed reality in laboratory automation can better connect the scientist to the task that the automation is performing by bringing the digital to the 'real world'. In particular, incorporation of mixed reality into the real-time view of the laboratory environment 102 can help bridge the gap between digital protocols and actual execution. Scientists will not only be able to better set up their experiments (e.g., via content provided by the configuration module 120), but they will be able to track in real-time what is happening during execution of those experiments (e.g., via content provided by the operation module). For example, if a user can 'see' where samples should be placed within the real-time environment, they can ensure proper placement. This can lead to more consistency, safer operation, and ultimately better data. Similarly, if a user can 'see' what the automated system is doing, then the user can better understand how the experiment is going and how the resulting data is generated. This can lead to increased traceability, more consistency, safer operation, and ultimately better data.

EXAMPLES

The below examples are provided as exemplary examples only and are not intended to limit the present invention to any implementations.

Example 1

Sample/Reagent Aliquot

The most basic, but widely used, application for automated liquid handling is sample or reagent dispensing or aliquoting. Scientists often need to dispense a valuable reagent or sample from a single tube or trough into numerous tubes or plates. This can be a labor-intensive task that is mundane and error-prone. To expedite this task a scientist can utilize an automated liquid handler. In one example, a user can be instructed by an augmented reality graphic to fill a large reagent trough with a set volume of water. The 96-well liquid dispensing head will then aspirate the water and dispense into the provided 96-well plate. An automated liquid handler is able to perform this task in a single transfer, whereas a scientist doing this by hand would need multiple transfers. In addition, the liquid handler digitally tracks each dispense, providing traceability and error-proofing that is not present when the task is performed by hand. However, the robotic liquid handler still relies on the user to set up the automation deck correctly. If the user puts the trough or plate in the wrong location, the instrument does not know and will not perform the transfer correctly. In addition, if not enough liquid is added to the trough, then the liquid handler will not aspirate the correct amount and the required volumes in each well will not be met. As provided here, using augmented reality to set-up the equipment correctly will lead to better results.

Example 2

PCR Set-up

Polymerase chain reaction (PCR) is a common molecular technique used to amplify segments of DNA to allow for many downstream applications, including DNA analysis or sequencing. Setting up a PCR reaction involves a series of liquid handling steps that often need to be performed in a particular sequence and utilizing a set amount of reagent and sample in order to get accurate and high-quality results. PCR reagents can be expensive, so performing large volume reactions can be cost-prohibitive. To overcome this challenge, laboratory automation platforms are utilized to miniaturize reaction volumes. Typically, scientists perform PCR reactions in single tubes or 96-well plates because they are easy to use and allow for reliable sample/reagent transfers. On a robotic system a scientist can utilize a plate with a much higher well density (384 wells/plate or 1536 wells/plate). This allows for miniaturization of the reaction, resulting in more data generation at a lower cost per reaction.

Since PCR set-up requires multiple reagents and samples, it can be an error-prone process. It is possible that a reagent or sample will be missed, which will result in a failed reaction. These failed reactions delay results and increase research costs. Automated liquid handling can help limit these mistakes, but they are still reliant on the user properly setting up the automation for the reaction. Since this is a multi-reagent reaction, it is vital that the user places the correct reagent or sample in the desired location. If this is not performed correctly, the reaction will either fail or generate incorrect data. Augmented reality can assist the user through targeted prompts, embedded videos, and visual signals to ensure the correct reagents and samples are placed in the desired location. The end result will be a lower failure rate and higher quality data generation.

Figure 8:
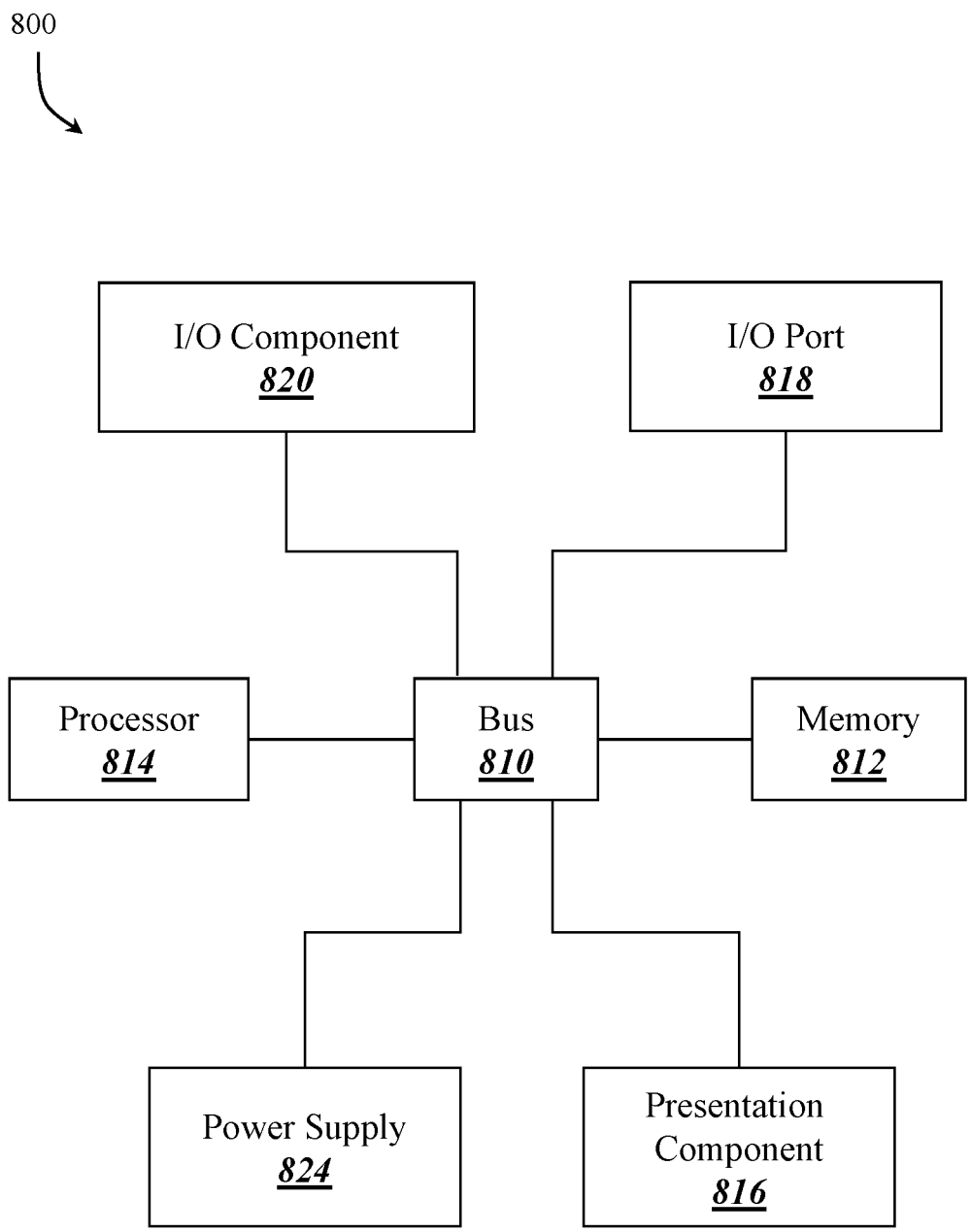
FIG. 8 shows an exemplary computer architecture for use, in accordance with the present invention.

Any suitable computing device can be used to implement the computing devices 110, 122 and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 800 is depicted in FIG. 8. The computing device 500 is merely an illustrative example of a suitable computing environment and in no way limits the scope of the present invention. A "computing device," as represented by FIG. 8, can include a "workstation," a "server," a "laptop," a "desktop," a "hand-held device," a "mobile device," a "tablet computer," or other computing devices, as would be understood by those of skill in the art. Given that the computing device 800 is depicted for illustrative purposes, embodiments of the present invention may utilize any number of computing devices 500 in any number of different ways to implement a single embodiment of the present invention. Accordingly, embodiments of the present invention are not limited to a single computing device 500, as would be appreciated by one with skill in the art, nor are they limited to a single type of implementation or configuration of the example computing device 500.

The computing device 800 can include a bus 810 that can be coupled to one or more of the following illustrative components, directly or indirectly: a memory 812, one or more processors 814, one or more presentation components 816, input/output ports 818, input/output components 820, and a power supply 824. One of skill in the art will appreciate that the bus 810 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 8 is merely illustrative of an exemplary computing device that can be used to implement one or more embodiments of the present invention, and in no way limits the invention.

The computing device 800 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 800.

The memory 812 can include computer-storage media in the form of volatile and/or nonvolatile memory. The memory 812 may be removable, non-removable, or any combination thereof. Exemplary hardware devices are devices such as hard drives, solid-state memory, optical-disc drives, and the like. The computing device 800 can include one or more processors that read data from components such as the memory 812, the various I/O components 816, etc. Presentation component(s) 816 present data indications to a user or other device. Exemplary presentation components include a display device, speaker, printing component, vibrating component, etc.

The I/O ports 818 can enable the computing device 800 to be logically coupled to other devices, such as I/O components 820. Some of the I/O components 820 can be built into the computing device 800. Examples of such I/O components 820 include a microphone, joystick, recording device, game pad, satellite dish, scanner, printer, wireless device, networking device, and the like.

As utilized herein, the terms "comprises" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one non-limiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:

1. A method comprising:
receiving, by at least one processor, a simulated laboratory configuration for an environment;
wherein the environment comprises at least one laboratory component marker positioned throughout the environment marking possible laboratory component positions associated with possible laboratory component actions;
wherein the simulated laboratory configuration defines:
at least one laboratory component position of the possible laboratory component positions associated with a positioning for at least one laboratory component, and
at least one laboratory protocol for performing at least one laboratory process;
wherein the at least one laboratory protocol comprises an automated sequence of at least one laboratory component action using the at least one laboratory component in the at least one laboratory component position;

receiving, by the at least one processor, an image from an image feed of the environment;

detecting, by the at least one processor, the at least one laboratory component marker in the image of the environment;

matching, by the at least one processor, the at least one laboratory component marker with the at least one laboratory component and the at least one laboratory component action;

determining, by the at least one processor, a configuration of the at least one laboratory component at a location of the at least one laboratory component marker based at least in part on the at least one laboratory protocol of the simulated laboratory configuration so as to enable the at least one laboratory component action to be performed using the at least one laboratory component based at least in part on the at least one laboratory protocol of the simulated laboratory configuration, the at least one laboratory component action being associated with at least one instruction;

generating, by the at least one processor, an animation of the at least one instruction;

causing to display, by the at least one processor, an overlay of the animation to appear, via an augmented reality device associated with at least one user, in the location in the environment of the at least one laboratory component in the environment so as to instruct the at least one user to configure the at least one laboratory component at the at least one laboratory component position according to the at least one laboratory protocol to enable performance the at least one laboratory component action according to the laboratory process;

receiving, by the at least one processor in real-time, at least one subsequent image from the image feed of the environment;

determining, by the at least one processor in real-time, at least one status of the at least one laboratory component action being performed via the at least one laboratory component based at least in part on the at least one subsequent image and the simulated laboratory configuration;

determining, by the at least one processor in real-time, at least one correction to the at least one laboratory component status based at least in part on the simulated laboratory configuration;

generating, by the at least one processor in real-time, an additional animation of the at least one correction; and causing to display, by the at least one processor in real-time, an additional overlay of the additional animation to appear, via the augmented reality device associated with the at least one user, in the location in the environment of the at least one laboratory component in the environment.

2. The method as recited in claim 1, wherein the environment comprises a laboratory environment.

3. The method as recited in claim 1, wherein the at least one instruction is associated with establishing a laboratory component configuration.

4. The method as recited in claim 1, further comprising:
determining, by the at least one processor, a display location on a display of the augmented reality device that intersects a line-of-sight to the location in the environment; and
generating, by the at least one processor, a depiction of the animation in the display location to simulate the environment of the at least one laboratory component, the at least one laboratory component action, or both appearing in the location in the environment.

5. The method as recited in claim 1, wherein the image feed is received from an image capture device of the augmented reality device in real-time.

6. The method as recited in claim 1, further comprising determining, by the at least one processor, a sequence of automated component markers of the at least one laboratory component marker associated with a sequence of steps in the at least one instruction;
wherein the at least one laboratory component marker is a plurality of laboratory component markers.

7. The method as recited in claim 1, further comprising determining, by the at least one processor, an environment state associated with objects within the image of the environment, wherein the environment state comprises a real-time state of at least one of: materials, equipment, components or data.

8. The method as recited in claim 7, further comprising determining, by the at least one processor, a first step of the at least one instruction based at least in part on the environment state.

9. The method as recited in claim 1, further comprising:
identifying, by the at least one processor, changes to the at least one laboratory component represented in the image feed based at least in part on differences between images in the image feed;
wherein the changes comprise at least one of:
at least one change of location, or
at least one change in volume of at least one liquid;
determining, by the at least one processor, user actions in the environment based at least in part on the changes to the environment; and
logging, by the at least one processor, the user actions in a user action log.

10. A method comprising:
receiving, by at least one processor, a simulated laboratory configuration for an environment;
wherein the environment comprises at least one laboratory component marker positioned throughout the environment marking possible laboratory component positions associated with automated performance of possible laboratory component actions;
wherein the simulated laboratory configuration defines:
at least one laboratory component position of the possible laboratory component positions associated with a positioning for at least one laboratory component, and
at least one laboratory protocol for performing at least one laboratory process;
wherein the at least one laboratory protocol comprises a plurality of laboratory component actions for physically configuring a plurality of laboratory components using the at least one laboratory component position;
receiving, by at least one processor, at least one image from an image feed of the laboratory environment during performance of the plurality of laboratory component actions of the at least one laboratory protocol;
detecting, by the at least one processor in real-time, the at least one laboratory component marker in the at least one image of the laboratory environment associated with a location in the simulated laboratory configuration;
determining, by the at least one processor in real-time, at least one status of at least one laboratory component action of the plurality of laboratory component actions based on the at least one laboratory component marker and the at least one image;
selecting, by the at least one processor in real-time, at least one instruction for at least one correction, at the location of the at least one laboratory component marker, based at least in part on the at least one status of the at least one laboratory component action in the at least one laboratory protocol;
generating, by the at least one processor in real-time, an animation of the at least one instruction associated with correcting the laboratory component configuration; and
causing to display, by the at least one processor in real-time, an overlay of the animation to appear, via an augmented reality device associated with at least one user, in the location for the laboratory component configuration to visually instruct the at least one user according to the at least one instruction for the laboratory component configuration to correct the at least one laboratory component at the at least one laboratory component position according to the at least one laboratory protocol.

11. The method as recited in claim 10, further comprising:
determining, by the at least one processor, a display location on a display of the augmented reality device that intersects a line-of-sight to the location in the laboratory environment; and
generating, by the at least one processor, a depiction of the animation in the display location to simulate the laboratory environment of the at least one laboratory component, the at least one laboratory component action, or both appearing in the location in the laboratory environment.

12. The method as recited in claim 10, wherein the image feed is received from an image capture device of the augmented reality device in real-time.

13. The method as recited in claim 10, further comprising determining, by the at least one processor, a sequence of automated component markers of the at least one automated component marker associated with a sequence of steps in the at least one instruction.

14. The method as recited in claim 10, further comprising determining, by the at least one processor, a laboratory state associated with objects within the image of the laboratory environment.

15. The method as recited in claim 14, further comprising determining, by the at least one processor, a first step of the at least one instruction based at least in part on the laboratory state.

16. The method as recited in claim 10, further comprising:
identifying, by the at least one processor, changes to the laboratory environment represented in the image feed based at least in part on differences between images in the image feed;
determining, by the at least one processor, user actions in the laboratory environment based at least in part on the changes to the laboratory environment; and
logging, by the at least one processor, the user actions in a user action log.

17. A system comprising:
at least one processor in communication with a non-transitory computer readable medium having instructions stored thereon that cause the at least one processor to perform steps to:
receive a simulated laboratory configuration for an environment;
wherein the environment comprises at least one laboratory component marker positioned throughout the environment marking possible laboratory component positions associated with possible laboratory component actions;
wherein the simulated laboratory configuration defines:
at least one laboratory component position of the possible laboratory component positions associated with a positioning for at least one laboratory component, and
at least one laboratory protocol for performing at least one laboratory process;
wherein the at least one laboratory protocol comprises an automated sequence of at least one laboratory component action using the at least one laboratory component in the at least one laboratory component position;
receive an image from an image feed of the environment;
detect the at least one laboratory component marker in the image of the environment;
match the at least one laboratory component marker with the at least one laboratory component and the at least one laboratory component action;
determine a configuration of the at least one laboratory component at a location of the at least one laboratory component marker based at least in part on the at least one laboratory protocol of the simulated laboratory configuration so as to enable the at least one laboratory component action to be performed using the at least one laboratory component based at least in part on the at least one laboratory protocol of the simulated laboratory configuration, the at least one laboratory component action being associated with at least one instruction;
generate an animation of the at least one instruction; and
cause to display an overlay of the animation to appear, via an augmented reality device associated with at least one user, in the location in the environment of the at least one laboratory component in the environment so as to instruct the at least one user to configure the at least one laboratory component at the at least one laboratory component position according to the at least one laboratory protocol to enable performance the at least one laboratory component action according to the laboratory process;
receive, in real-time, at least one subsequent image from the image feed of the environment;
determine, in real-time, at least one status of the at least one laboratory component action being performed via the at least one laboratory component based at least in part on the at least one subsequent image and the simulated laboratory configuration;
determine, in real-time, at least one correction to the at least one laboratory component status based at least in part on the simulated laboratory configuration;
generate, in real-time, an additional animation of the at least one correction; and
cause to display, in real-time, an additional overlay of the additional animation to appear, via the augmented reality device associated with the at least one user, in the location in the environment of the at least one laboratory component in the environment.

18. The system as recited in claim 17, further comprising an augmented reality device in communication with the at least one processor and configured to:
receive the animation;

determine a display location on a display of the augmented reality device that intersects a line-of-sight to the location in the environment; and generates a depiction of the animation in the display location to simulate the environment of the at least one laboratory component, the at least one laboratory component action, or both appearing in the location in the environment.

19. The system as recited in claim 17, further comprising an image capture device in communication with the at least one processor and configured to capture a real-time image feed of the environment.

20. The system as recited in claim 17, wherein the at least one processor is further configured to execute instructions to perform steps to:

identify changes to the environment represented in the image feed based at least in part on differences between images in the image feed;

determine user actions in the environment based at least in part on the changes to the environment; and log the user actions in a user action log.

* * * * *